United States Patent
Fei et al.

(10) Patent No.: US 12,225,467 B2
(45) Date of Patent: Feb. 11, 2025

(54) PAGING METHOD AND APPARATUS

(71) Applicant: HUAWEI TECHNOLOGIES CO., LTD., Shenzhen (CN)

(72) Inventors: Yongqiang Fei, Shenzhen (CN); Juan Zheng, Beijing (CN); Hailong Hou, Beijing (CN); Chaojun Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 391 days.

(21) Appl. No.: 17/859,282

(22) Filed: Jul. 7, 2022

(65) Prior Publication Data

US 2022/0338121 A1 Oct. 20, 2022

Related U.S. Application Data

(63) Continuation of application No. PCT/CN2020/071540, filed on Jan. 10, 2020.

(51) Int. Cl.
*H04W 72/23* (2023.01)
*H04L 5/00* (2006.01)
(Continued)

(52) U.S. Cl.
CPC ....... *H04W 52/0229* (2013.01); *H04L 5/0051* (2013.01); *H04W 52/0216* (2013.01); *H04W 68/00* (2013.01); *H04W 72/23* (2023.01)

(58) Field of Classification Search
CPC ......... H04W 52/0216; H04W 52/0229; H04W 52/0235; H04W 52/0245; H04W 68/00;
(Continued)

(56) References Cited

U.S. PATENT DOCUMENTS 12,034,659 B2 * 7/2024 Hwang ................ H04W 64/00
2019/0349856 A1 11/2019 Liu et al.
(Continued)

FOREIGN PATENT DOCUMENTS

CN 109661021 A 4/2019
CN 109923914 A 6/2019
(Continued)

OTHER PUBLICATIONS

Extended European Search Report issued in corresponding European Application No. 20911505.4, mailed Nov. 15, 2022, pp. 1-10.
(Continued)

*Primary Examiner* — Joseph Arevalo
(74) *Attorney, Agent, or Firm* — HAUPTMAN HAM, LLP

(57) ABSTRACT

An apparatus includes one or more processors and a memory having instructions stored thereon that, when executed by the one or more processors, cause the apparatus to receive a first wake-up signal. The first wake-up signal is one of K wake-up signals, K is an integer greater than or equal to 1, and the K wake-up signals are quasi co-located with K synchronization signal blocks (SSBs), K channel state information-reference signals (CSI-RSs), or K demodulation reference signals (DMRSs). The apparatus is also caused to determine M paging occasions. There is a correspondence between the K wake-up signals and the M paging occasions, and M is an integer greater than or equal to 1. The apparatus is further caused to receive, on the M paging occasions, downlink control information (DCI) used for paging.

14 Claims, 12 Drawing Sheets

(51) Int. Cl.
*H04W 52/02* (2009.01)
*H04W 68/00* (2009.01)

(58) Field of Classification Search
CPC ... H04W 68/005; H04W 68/02; H04W 72/23; H04W 74/0833; H04W 76/28; H04L 5/0051; H04L 5/005; H04L 5/0053
USPC .............................. 370/329, 311, 350, 328
See application file for complete search history.

(56) References Cited

U.S. PATENT DOCUMENTS

| | | | |
|---|---|---|---|
| 2021/0136689 A1* | 5/2021 | Kim ................. | H04W 52/0235 |
| 2021/0168779 A1* | 6/2021 | Mondal .............. | H04L 5/0035 |
| 2022/0124674 A1* | 4/2022 | Babaei ............... | H04W 68/02 |
| 2023/0032593 A1* | 2/2023 | Chen ................. | H04W 76/20 |
| 2023/0189147 A1* | 6/2023 | Bala .................. | H04W 68/02 370/311 |
| 2023/0208587 A1* | 6/2023 | He .................... | H04W 52/0232 370/329 |
| 2023/0388077 A1* | 11/2023 | Maleki ............... | H04W 76/27 |
| 2024/0015759 A1* | 1/2024 | Koskela .............. | H04W 16/28 |

FOREIGN PATENT DOCUMENTS

| | | |
|---|---|---|
| CN | 110198557 A | 9/2019 |
| CN | 110299978 A | 10/2019 |
| CN | 110493815 A | 11/2019 |
| WO | 2019061369 A1 | 4/2019 |
| WO | 2019086674 A1 | 5/2019 |
| WO | 2019160271 A1 | 8/2019 |
| WO | 2019179261 A1 | 9/2019 |

OTHER PUBLICATIONS

3GPP TS 38.304 V15.6.0 (Dec. 2019), 3rd Generation Partnership Project; Technical Specification Group Radio Access Network; NR; User Equipment (UE) procedures in Idle mode and RRC Inactive state(Release 15), 30 pages.

3GPP TS 38.213 V15.7.0 (Sep. 2019), 3rd Generation Partnership Project; Technical Specification Group Radio Access Network; NR; Physical layer procedures for control(Release 15), 108 pages.

3GPP TS 38.331 V15.8.0 (Dec. 2019), 3rd Generation Partnership Project; Technical Specification Group Radio Access Network;NR-;Radio Resource Control (RRC) protocol specification(Release 15), total 532 pages.

Ericsson, "Wake-up signal configurations and procedures for NB-IoT", 3GPP TSG-RAN WG1 Meeting #92 R1-1804153, Apr. 20, 2018,total 8 pages.

Vivo, "On UE-group wake-up signal for eMTC", 3GPP TSG RAN WG1 #94 R1-1808215,Aug. 24, 2018,total 4 pages.

Huawei et al, "On wake-up signal for eFeMTC", 3GPP TSG RAN WG1 Meeting #93 R1-1805979, May 25, 2018,total 5 pages.

Nokia et al, "Wake-up signal for efeMTC", 3GPP TSG RAN WG1 Meeting #92 R1-1804243, Apr. 20, 2018,total 8 pages.

Qualcomm Incorporated, "UE-group wake-up signal for MTC", 3GPP TSG-RAN WG1 #98bis R1-1910716, Oct. 20, 2019,total 6 pages.

NTT DOCOMO Inc., "Discussion on UE-group wake up signal in eMTC", 3GPP TSG RAN WG1 #99 R1-1912865, Nov. 22, 2019,total 4 pages.

International Search Report issued in corresponding International Application No. PCT/CN2020/071540, dated Oct. 10, 2020, pp. 1-9.

Chinese Office Action issued in corresponding Chinese Application No. 202080053487.3, dated Apr. 20, 2023, pp. 1-16.

* cited by examiner (a) If the WUS is detected, listen to a paging message on N subsequent POs (b) If the WUS is not detected, there is no need to listen to a paging message on N subsequent POs

PAGING METHOD AND APPARATUS

CROSS-REFERENCE TO RELATED APPLICATIONS

This application is a continuation of International Application No. PCT/CN2020/071540, filed on Jan. 10, 2020, the disclosure of which is hereby incorporated by reference in its entirety.

TECHNICAL FIELD

Embodiments of this application relate to the field of communication technologies, and in particular, to a paging method and an apparatus.

BACKGROUND

In a communication system, for example, a new radio (NR) system, a network device may send a paging message to a terminal device that is in idle mode, sleeping mode, or inactive mode, to page the terminal device. Downlink control information (DCI) for scheduling the paging message is also referred to as paging DCI, and may be sent on a paging occasion (PO). The PO may be defined based on a paging search space and a control resource set (CORESET). The terminal device may determine a location of the PO based on an identifier of the terminal device, and receive, monitor, detect, or listen to the paging DCI on the PO. The terminal device may receive the paging message based on the paging DCI.

In the foregoing solution, the terminal device that is in idle mode, sleeping mode, or inactive mode needs to periodically receive, monitor, detect, or listen to the paging DCI on the PO, resulting in high power consumption.

SUMMARY

Embodiments of this application provide a communication method and apparatus, to reduce power consumption of a terminal device.

According to a first aspect, a communication method is provided. The method may be performed by a terminal device, or may be performed by a component (for example, a processor, a chip, or a chip system) of the terminal device. The method includes: receiving a first wake-up signal, where the first wake-up signal is one of K wake-up signals, and K is an integer greater than or equal to 1; determining a first physical downlink control channel PDCCH monitoring occasion in M paging occasions based on the first wake-up signal, where there is a correspondence between the first wake-up signal and the first PDCCH monitoring occasion, and M is an integer greater than or equal to 1; and receiving paging DCI on the first PDCCH monitoring occasion. The correspondence between the first wake-up signal and the first PDCCH monitoring occasion may be one-to-one, one-to-many, many-to-one, or many-to-many. This is not limited. The correspondence between the first wake-up signal and the first PDCCH monitoring occasion may be predefined, or may be configured by a network device.

According to the foregoing method, the terminal device receives the first wake-up signal, and then monitors the paging DCI on the first PDCCH monitoring occasion corresponding to the first wake-up signal. Compared with a case in which the terminal device continuously monitors the paging DCI on all PDCCH monitoring occasions, this can reduce power consumption of the terminal device.

In a possible design, there is a correspondence between the K wake-up signals and the M paging occasions. One of the M paging occasions includes K PDCCH monitoring occasions, and the first PDCCH monitoring occasion is one of the K PDCCH monitoring occasions. The correspondence between the wake-up signals and the paging occasions may be one-to-one, one-to-many, many-to-one, or many-to-many. The correspondence between the wake-up signals and the paging occasions may be predefined, or may be configured by the network device.

According to the foregoing method, the terminal device monitors the paging DCI on the first PDCCH monitoring occasion in the M paging occasions corresponding to the wake-up signals. Compared with a case in which the terminal device continuously monitors the paging DCI on all paging occasions, this can reduce power consumption of the terminal device.

In a possible design, the K wake-up signals are quasi co-located with K synchronization signal blocks SSBs, the K wake-up signals are quasi co-located with K channel state information-reference signals CSI-RSs, or the K wake-up signals are quasi co-located with K DMRSs.

According to the foregoing method, the terminal device may first receive an SSB, a CSI-RS, a DMRS, or the like, adjust and/or optimize a reception beam based on quality of receiving the SSB, the CSI-RS, or the DMRS, and receive a wake-up signal by using the adjusted and/or optimized reception beam, so that a probability of missed detection or false detection of the wake-up signal is reduced.

In a possible design, the K wake-up signals are generated based on a same sequence or different sequences. For example, the K wake-up signals may be generated based on K sequences. Alternatively, the K wake-up signals may be generated based on the same sequence. For example, different weighted processing or precoding may be performed on K parts of the same sequence to obtain the K wake-up signals.

According to the foregoing method, because resources of an m-sequence, a Gold sequence, a ZC sequence, or the like for generating a wake-up signal are limited, sequence resource utilization can be improved in a manner of generating a plurality of wake-up signals based on a same sequence.

In a possible design, K is an integer greater than or equal to 2.

In a possible design, the K wake-up signals may occupy different frequency domain resources. For example, the K wake-up signals may be frequency division multiplexed, and occupy a same time domain resource but different frequency domain resources. Frequency domain resources occupied by the wake-up signals have a same size or different sizes. An advantage is as follows: In a design of frequency division multiplexing, the wake-up signals may be sent in narrow bandwidth, so that the terminal device can detect the wake-up signals in the narrow bandwidth. This helps reduce detection complexity.

Alternatively, the K wake-up signals may occupy different time domain resources. For example, the K wake-up signals may be time division multiplexed, and occupy a same frequency domain resource but different time domain resources. Time domain resources occupied by the wake-up signals have a same size or different sizes. An advantage is as follows: In a design of time division multiplexing, the wake-up signals may be sent in some bandwidth, so that the terminal device can receive and detect different WUSs in the fixed bandwidth. In this way, the terminal device performs beam training or channel measurement based on the WUSs.

Alternatively, the K wake-up signals may be sent by using a combination of time division multiplexing and frequency division multiplexing. An advantage is as follows: The terminal device may perform narrowband receiving on a WUS. However, when the terminal device needs to receive WUSs from different locations at different time points, the terminal device may receive and detect the WUSs in a broadband manner, to perform beam training or channel measurement within a range of the broadband. In this way, the terminal device can select, based on a requirement of the terminal device, an appropriate manner of receiving the WUSs. This improves flexibility of WUS detection.

In a possible design, that there is a correspondence between the first wake-up signal and the first PDCCH monitoring occasion includes one or more of the following: There is a correspondence between a time domain resource of the first wake-up signal and the first PDCCH monitoring occasion; there is a correspondence between a frequency domain resource of the first wake-up signal and the first PDCCH monitoring occasion; there is a correspondence between a code domain resource of the first wake-up signal and the first PDCCH monitoring occasion; there is a correspondence between a spatial domain resource of the first wake-up signal and the first PDCCH monitoring occasion; there is a correspondence between an identifier of the first wake-up signal and the first PDCCH monitoring occasion; or there is a correspondence between a sequence of the first wake-up signal and the first PDCCH monitoring occasion.

In a possible design, the correspondence between the first wake-up signal and the first PDCCH monitoring occasion may be predefined, or may be configured by the network device. After receiving the first WUS, the terminal device may determine the first PDCCH monitoring occasion based on at least one of the frequency domain resource occupied by the first WUS, the time domain resource occupied by the first WUS, the code domain resource occupied by the first WUS, the spatial domain resource occupied by the first WUS, the identifier of the first WUS, or the sequence of the first WUS. Manners are flexible and diversified. The network device may determine a correspondence between the first WUS and a first PDCCH monitoring occasion based on load and resource usage of the network device, so that the first WUS and the first PDCCH monitoring occasion are easily indicated.

According to a second aspect, a communication method is provided. For beneficial effects of the second aspect, refer to descriptions of the first aspect. The method may be performed by a network device, or may be performed by a component (for example, a processor, a chip, or a chip system) of the network device. The method includes: sending a first wake-up signal, where the first wake-up signal is one of K wake-up signals, and K is an integer greater than or equal to 1; and sending, on a first physical downlink control channel PDCCH monitoring occasion in M paging occasions, downlink control information DCI used for paging, where there is a correspondence between the first wake-up signal and the first PDCCH monitoring occasion, and M is an integer greater than or equal to 1.

In a possible design, there is a correspondence between the K wake-up signals and the M paging occasions. One of the M paging occasions includes K PDCCH monitoring occasions, and the first PDCCH monitoring occasion is one of the K PDCCH monitoring occasions.

In a possible design, the K wake-up signals are quasi co-located with K synchronization signal blocks SSBs, the K wake-up signals are quasi co-located with K channel state information-reference signals CSI-RSs, or the K wake-up signals are quasi co-located with K demodulation reference signals DMRSs.

In a possible design, the K wake-up signals are generated based on a same sequence or different sequences.

In a possible design, K is an integer greater than or equal to 2.

In a possible design, the K wake-up signals occupy different frequency domain resources, and/or the K wake-up signals occupy different time domain resources.

In a possible design, that there is a correspondence between the first wake-up signal and the first PDCCH monitoring occasion includes one or more of the following: There is a correspondence between a time domain resource of the first wake-up signal and the first PDCCH monitoring occasion; there is a correspondence between a frequency domain resource of the first wake-up signal and the first PDCCH monitoring occasion; there is a correspondence between a code domain resource of the first wake-up signal and the first PDCCH monitoring occasion; there is a correspondence between a spatial domain resource of the first wake-up signal and the first PDCCH monitoring occasion; there is a correspondence between a sequence of the first wake-up signal and the first PDCCH monitoring occasion; or there is a correspondence between an identifier of the first wake-up signal and the first PDCCH monitoring occasion.

According to a third aspect, a communication method is provided. The method may be performed by a terminal device, or may be performed by a component (for example, a processor, a chip, or a chip system) of the terminal device. The method includes: receiving a first wake-up signal, where the first wake-up signal is one of K wake-up signals, and K is an integer greater than or equal to 1; determining M paging occasions based on the first wake-up signal, where there is a correspondence between the K wake-up signals and the M paging occasions, and M is an integer greater than or equal to 1; and receiving, on the M paging occasions, downlink control information DCI used for paging.

According to the foregoing method, the terminal device monitors paging DCI on the M paging occasions corresponding to the K wake-up signals. Compared with a case in which the terminal device continuously monitors the paging DCI on all paging occasions, this can reduce power consumption of the terminal device.

In a possible design, there is a correspondence between the first wake-up signal and the first PDCCH monitoring occasion. The DCI used for paging is received on the first PDCCH monitoring occasion in the M paging occasions. One of the M paging occasions includes K PDCCH monitoring occasions, and the first PDCCH monitoring occasion is one of the K PDCCH monitoring occasions.

According to the foregoing method, the terminal device monitors the paging DCI on the first PDCCH monitoring occasion in the M paging occasions. Compared with a case in which the terminal device monitors the paging DCI on all the K PDCCH monitoring occasions in the M paging occasions, this can reduce power consumption of the terminal device.

In a possible design, that there is a correspondence between the first wake-up signal and the first PDCCH monitoring occasion includes one or more of the following: There is a correspondence between a time domain resource of the first wake-up signal and the first PDCCH monitoring occasion; there is a correspondence between a frequency domain resource of the first wake-up signal and the first PDCCH monitoring occasion; there is a correspondence between a code domain resource of the first wake-up signal and the first PDCCH monitoring occasion; there is a correspondence between a spatial domain resource of the first wake-up signal and the first PDCCH monitoring occasion; there is a correspondence between a sequence of the first wake-up signal and the first PDCCH monitoring occasion; or there is a correspondence between an identifier of the first wake-up signal and the first PDCCH monitoring occasion.

According to the foregoing method, after receiving the first wake-up signal, the terminal device may determine the first PDCCH monitoring occasion based on at least one of the time domain resource occupied by the first wake-up signal, the frequency domain resource occupied by the first wake-up signal, the code domain resource occupied by the first wake-up signal, the spatial domain resource occupied by the first wake-up signal, the identifier of the first wake-up signal, the sequence of the first wake-up signal, or the like. Manners are flexible and diversified. The network device may determine a correspondence between the first WUS and a first PDCCH monitoring occasion based on load and resource usage of the network device, so that the first WUS and the first PDCCH monitoring occasion are easily indicated.

In a possible design, the K wake-up signals are quasi co-located with K synchronization signal blocks SSBs, the K wake-up signals are quasi co-located with K channel state information-reference signals CSI-RSs, or the K wake-up signals are quasi co-located with K demodulation reference signals DMRSs.

According to the foregoing method, the terminal device may first receive an SSB, a CSI-RS, or a DMRS, adjust and/or optimize a reception beam based on quality of receiving the SSB, the CSI-RS, or the DMRS, and receive a wake-up signal by using the adjusted and/or optimized reception beam, so that a probability of missed detection or false detection of the wake-up signal is reduced.

In a possible design, the K wake-up signals are generated based on a same sequence or different sequences. A sequence for generating a wake-up signal may include an m-sequence, a Gold sequence, a ZC sequence, or the like. Because resources of the sequence for generating a wake-up signal are limited, sequence resource utilization can be improved in a manner of generating a plurality of wake-up signals based on a same sequence.

In a possible design, that K is an integer greater than or equal to 1 is specifically: K is an integer greater than or equal to 2.

In a possible design, the K wake-up signals may occupy different frequency domain resources. For example, the K wake-up signals may be frequency division multiplexed, and occupy a same time domain resource but different frequency domain resources. Frequency domain resources occupied by the wake-up signals have a same size or different sizes. An advantage is as follows: In a design of frequency division multiplexing, the wake-up signals may be sent in narrow bandwidth, so that the terminal device can detect the wake-up signals in the narrow bandwidth. This helps reduce detection complexity.

Alternatively, the K wake-up signals may occupy different time domain resources. For example, the K wake-up signals may be time division multiplexed, and occupy a same frequency domain resource but different time domain resources. Time domain resources occupied by the wake-up signals have a same size or different sizes. An advantage is as follows: In a design of time division multiplexing, the wake-up signals may be sent in some bandwidth, so that the terminal device can receive and detect different WUSs in the fixed bandwidth. In this way, the terminal device performs beam training or channel measurement based on the WUSs.

Alternatively, the K wake-up signals may be sent by using a combination of time division multiplexing and frequency division multiplexing. An advantage is as follows: The terminal device may perform narrowband receiving on a WUS. However, when the terminal device needs to receive WUSs from different locations at different time points, the terminal device may receive and detect the WUSs in a broadband manner, to perform beam training or channel measurement within a range of the broadband. In this way, the terminal device can select, based on a requirement of the terminal device, an appropriate manner of receiving the WUSs. This improves flexibility of WUS detection.

According to a fourth aspect, a communication method is provided. For beneficial effects of the fourth aspect, refer to descriptions of the third aspect. The method may be performed by a network device, or may be performed by a component (for example, a processor, a chip, or a chip system) of the network device. The method includes: sending a first wake-up signal, where the first wake-up signal is one of K wake-up signals, and K is an integer greater than or equal to 1; and sending, on M paging occasions, downlink control information DCI used for paging, where M is an integer greater than or equal to 1, and there is a correspondence between the K wake-up signals and the M paging occasions.

In a possible design, the DCI used for paging is sent on a first physical downlink control channel PDCCH monitoring occasion in the M paging occasions, where there is a correspondence between the first wake-up signal and the first PDCCH monitoring occasion. One of the M paging occasions includes K PDCCH monitoring occasions, and the first PDCCH monitoring occasion is one of the K PDCCH monitoring occasions.

In a possible design, that there is a correspondence between the first wake-up signal and the first PDCCH monitoring occasion includes one or more of the following: There is a correspondence between a time domain resource of the first wake-up signal and the first PDCCH monitoring occasion; there is a correspondence between a frequency domain resource of the first wake-up signal and the first PDCCH monitoring occasion; there is a correspondence between a code domain resource of the first wake-up signal and the first PDCCH monitoring occasion; there is a correspondence between a spatial domain resource of the first wake-up signal and the first PDCCH monitoring occasion; there is a correspondence between a sequence of the first wake-up signal and the first PDCCH monitoring occasion; or there is a correspondence between an identifier of the first wake-up signal and the first PDCCH monitoring occasion.

In a possible design, the K wake-up signals are quasi co-located with K synchronization signal blocks SSBs, the K wake-up signals are quasi co-located with K channel state information-reference signals CSI-RSs, or the K wake-up signals are quasi co-located with K demodulation reference signals DMRSs.

In a possible design, the K wake-up signals are generated based on a same sequence or different sequences.

In a possible design, that K is an integer greater than or equal to 1 is specifically: K is an integer greater than or equal to 2.

In a possible design, the K wake-up signals occupy different frequency domain resources. For example, the K wake-up signals may be frequency division multiplexed. Alternatively, the K wake-up signals occupy different time domain resources. For example, the K wake-up signals may be time division multiplexed. Alternatively, the K wake-up signals may be time division multiplexed and frequency division multiplexed.

According to a fifth aspect, an embodiment of this application provides an apparatus. The apparatus may implement the method according to any one of the first aspect or the possible implementations of the first aspect. The apparatus includes a corresponding unit or component configured to perform the foregoing method. The unit included in the apparatus may be implemented by using software and/or hardware. The apparatus may be, for example, a terminal, or a chip, a chip system, or a processor that can support the terminal in implementing the foregoing method.

According to a sixth aspect, an embodiment of this application provides an apparatus. The apparatus may implement the method according to any one of the second aspect or the possible implementations of the second aspect. The apparatus includes a corresponding unit or component configured to perform the foregoing method. The unit included in the apparatus may be implemented by using software and/or hardware. The apparatus may be, for example, a network device, or a chip, a chip system, or a processor that can support the network device in implementing the foregoing method.

According to a seventh aspect, an embodiment of this application provides an apparatus. The apparatus may implement the method according to any one of the third aspect or the possible implementations of the third aspect. The apparatus includes a corresponding unit or component configured to perform the foregoing method. The unit included in the apparatus may be implemented by using software and/or hardware. The apparatus may be, for example, a terminal, or a chip, a chip system, or a processor that can support the terminal in implementing the foregoing method.

According to an eighth aspect, an embodiment of this application provides an apparatus. The apparatus may implement the method according to any one of the fourth aspect or the possible implementations of the fourth aspect. The apparatus includes a corresponding unit or component configured to perform the foregoing method. The unit included in the apparatus may be implemented by using software and/or hardware. The apparatus may be, for example, a network device, or a chip, a chip system, or a processor that can support the network device in implementing the foregoing method.

According to a ninth aspect, an embodiment of this application provides an apparatus. The apparatus includes a processor. The processor is coupled to a memory. The memory is configured to store a program or instructions. When the program or the instructions are executed by the processor, the apparatus is enabled to implement the method according to any one of the first aspect or the possible implementations of the first aspect.

According to a tenth aspect, an embodiment of this application provides an apparatus. The apparatus includes a processor. The processor is coupled to a memory. The memory is configured to store a program or instructions. When the program or the instructions are executed by the processor, the apparatus is enabled to implement the method according to any one of the second aspect or the possible implementations of the second aspect.

According to an eleventh aspect, an embodiment of this application provides an apparatus. The apparatus includes a processor. The processor is coupled to a memory. The memory is configured to store a program or instructions. When the program or the instructions are executed by the processor, the apparatus is enabled to implement the method according to any one of the third aspect or the possible implementations of the third aspect.

According to a twelfth aspect, an embodiment of this application provides an apparatus. The apparatus includes a processor. The processor is coupled to a memory. The memory is configured to store a program or instructions. When the program or the instructions are executed by the processor, the apparatus is enabled to implement the method according to any one of the fourth aspect or the possible implementations of the fourth aspect.

According to a thirteenth aspect, an embodiment of this application provides a computer-readable storage medium. The computer-readable storage medium stores a computer program or instructions. When the computer program or the instructions are executed, a computer is enabled to perform the method according to any one of the first aspect or the possible implementations of the first aspect.

According to a fourteenth aspect, an embodiment of this application provides a computer-readable storage medium. The computer-readable storage medium stores a computer program or instructions. When the computer program or the instructions are executed, a computer is enabled to perform the method according to any one of the second aspect or the possible implementations of the second aspect.

According to a fifteenth aspect, an embodiment of this application provides a computer-readable storage medium. The computer-readable storage medium stores a computer program or instructions. When the computer program or the instructions are executed, a computer is enabled to perform the method according to any one of the third aspect or the possible implementations of the third aspect.

According to a sixteenth aspect, an embodiment of this application provides a computer-readable storage medium. The computer-readable storage medium stores a computer program or instructions. When the computer program or the instructions are executed, a computer is enabled to perform the method according to any one of the fourth aspect or the possible implementations of the fourth aspect.

According to a seventeenth aspect, an embodiment of this application provides a computer program product. The computer program product includes computer program code. When the computer program code is run on a computer, the computer is enabled to perform the method according to any one of the first aspect or the possible implementations of the first aspect.

According to an eighteenth aspect, an embodiment of this application provides a computer program product. The computer program product includes computer program code. When the computer program code is run on a computer, the computer is enabled to perform the method according to any one of the second aspect or the possible implementations of the second aspect.

According to a nineteenth aspect, an embodiment of this application provides a computer program product. The computer program product includes computer program code. When the computer program code is run on a computer, the computer is enabled to perform the method according to any one of the third aspect or the possible implementations of the third aspect.

According to a twentieth aspect, an embodiment of this application provides a computer program product. The computer program product includes computer program code. When the computer program code is run on a computer, the computer is enabled to perform the method according to any one of the fourth aspect or the possible implementations of the fourth aspect.

According to a twenty-first aspect, an embodiment of this application provides a chip. The chip includes a processor. The processor is coupled to a memory. The memory is configured to store a program or instructions. When the program or the instructions are executed by the processor, the chip is enabled to implement the method according to any one of the first aspect or the possible implementations of the first aspect.

According to a twenty-second aspect, an embodiment of this application provides a chip. The chip includes a processor. The processor is coupled to a memory. The memory is configured to store a program or instructions. When the program or the instructions are executed by the processor, the chip is enabled to implement the method according to any one of the second aspect or the possible implementations of the second aspect.

According to a twenty-third aspect, an embodiment of this application provides a chip. The chip includes a processor. The processor is coupled to a memory. The memory is configured to store a program or instructions. When the program or the instructions are executed by the processor, the chip is enabled to implement the method according to any one of the third aspect or the possible implementations of the third aspect.

According to a twenty-fourth aspect, an embodiment of this application provides a chip. The chip includes a processor. The processor is coupled to a memory. The memory is configured to store a program or instructions. When the program or the instructions are executed by the processor, the chip is enabled to implement the method according to any one of the fourth aspect or the possible implementations of the fourth aspect.

According to a twenty-fifth aspect, an embodiment of this application provides a communication system. The communication system includes the apparatus according to the fifth aspect and/or the apparatus according to the sixth aspect; or includes the apparatus according to the seventh aspect and/or the apparatus according to the eighth aspect; or includes the apparatus according to the ninth aspect and/or the apparatus according to the tenth aspect; or includes the apparatus according to the eleventh aspect and/or the apparatus according to the twelfth aspect.

DESCRIPTION OF EMBODIMENTS

Figure 1:
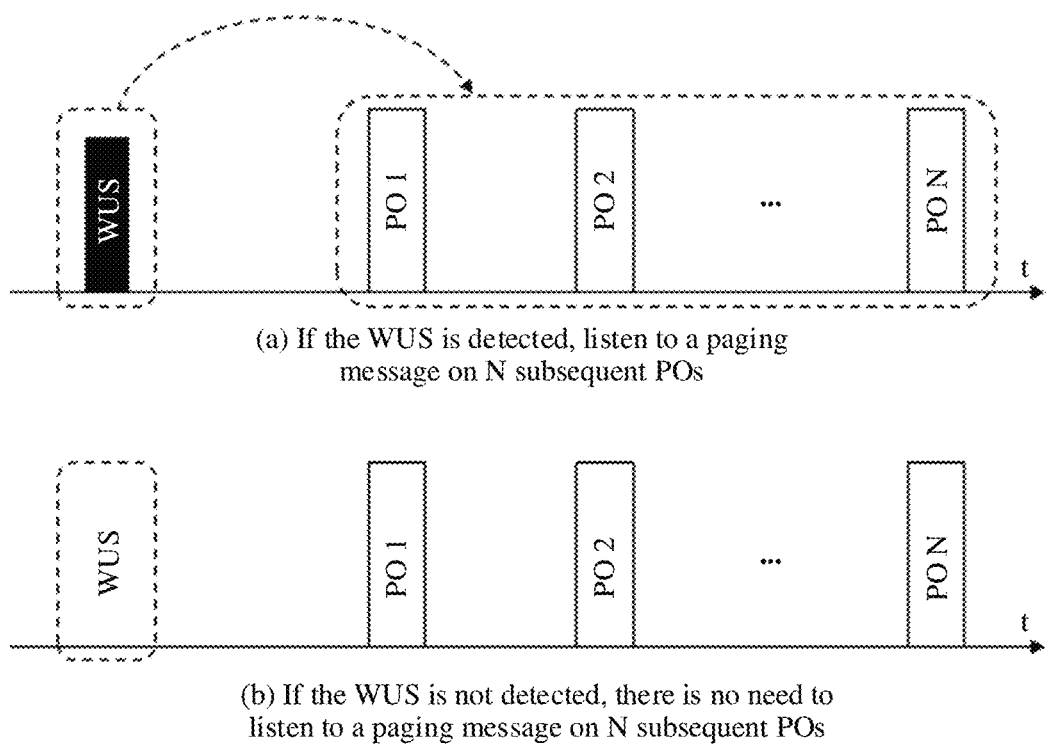
FIG. 1 is a schematic diagram of WUS detection according to an embodiment of this application.

For ease of understanding, communication nouns or terms used in embodiments of this application are explained and described.

1. Terminal Device

The terminal device may be referred to as a terminal for short, and is a device having a wireless transceiver function. The terminal device may be deployed on land, including being deployed indoor or outdoor or being handheld or vehicle-mounted; may be deployed on water (for example, on a ship); or may be deployed in the air (for example, on a plane, a balloon, or a satellite). The terminal device may be a mobile phone, a tablet computer (pad), a computer having a wireless transceiver function, a virtual reality (VR) terminal device, an augmented reality (AR) terminal device, a wireless terminal device in industrial control, a wireless terminal device in self-driving, a wireless terminal device in telemedicine (remote medical), a wireless terminal device in a smart grid, a wireless terminal device in transportation safety, a wireless terminal device in a smart city, or a wireless terminal device in a smart home, and may further include user equipment (UE) and the like. Alternatively, the terminal device may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a future 5th generation (5G) network, a terminal device in a future evolved public land mobile network (PLMN), or the like. The terminal device sometimes may also be referred to as user equipment (UE), an access terminal device, a vehicle-mounted terminal device, an industrial control terminal device, a UE unit, a UE station, a mobile station, a remote station, a remote terminal device, a mobile device, a UE terminal device, a wireless communication device, a UE agent, a UE apparatus, or the like. The terminal device may be fixed or mobile. This is not limited in embodiments of this application.

By way of example but not limitation, in this application, the terminal device may be a wearable device. The wearable device may also be referred to as a wearable intelligent device, and is a general term of wearable devices, such as glasses, gloves, watches, clothes, and shoes, that are developed by applying wearable technologies in intelligent designs of daily wear. The wearable device is a portable device that can be directly worn on a body or integrated into clothes or an accessory of a user. The wearable device is not only a hardware device, but is used to implement powerful functions through software support, data exchange, and cloud interaction. Generalized wearable intelligent devices include full-featured and large-size devices that can implement complete or partial functions without depending on smartphones, for example, smart watches or smart glasses, and devices that focus on only one type of application function and need to work with another device such as a smartphone, for example, various smart bands or smart accessories for monitoring physical signs.

In this application, the terminal device may be a terminal in an internet of things ( ) system. IoT is an important component in development of future information technologies. A main technical feature of the IoT is to connect an object to a network by using a communication technology, to implement an intelligent network of human-machine interconnection and thing-thing interconnection. The terminal device in this application may be a terminal device in machine type communication (MTC). The terminal device in this application may be a vehicle-mounted module, a vehicle-mounted component, a vehicle-mounted chip, or a vehicle-mounted unit that is built in a vehicle as one or more components or units. The vehicle uses the vehicle-mounted module, the vehicle-mounted component, the vehicle-mounted chip, or the vehicle-mounted unit that is built in the vehicle, to implement a method in this application. Therefore, embodiments of this application may be applied to the internet of vehicles, for example, vehicle to everything (V2X), long term evolution-vehicle (LTE-V), or vehicle-to-vehicle (V2V).

In embodiments of this application, an apparatus configured to implement a function of the terminal may be a terminal, or may be an apparatus, for example, a chip system or a processor, that can support the terminal in implementing the function. The apparatus may be disposed in the terminal. In embodiments of this application, the chip system may include a chip, or may include a chip and another discrete component. Technical solutions provided in embodiments of this application are described by using an example in which the apparatus configured to implement the function of the terminal is a terminal and the terminal is UE.

2. Network Device

The network device may be an access network device. The access network device may also be referred to as a radio access network (RAN) device, and is a device that provides a wireless communication function for the terminal device. For example, the access network device includes but is not limited to: a next-generation base station (gNB) in 5G, an evolved NodeB (eNB), a radio network controller (radio network controller, RNC), a NodeB (NB), a base station controller (base station controller, BSC), a base transceiver station (BTS), a home base station (for example, a home evolved NodeB or a home NodeB, HNB), a baseband unit (BBU), a transmission reception point (TRP), a transmission point (TP), a mobile switching center, and the like. Alternatively, the access network device may be a radio controller, a centralized unit (CU), and/or a distributed unit (DU) in a cloud radio access network (CRAN) scenario, or the network device may be a relay station, an access point, a vehicle-mounted device, a terminal device, a wearable device, a network device in a future 5G network, a network device in a future evolved PLMN, or the like. The terminal device may communicate with a plurality of access network devices that use different technologies. For example, the terminal device may communicate with an access network device that supports long term evolution (LTE), or may communicate with an access network device that supports 5G, or may implement dual connectivity to an access network device that supports LTE and an access network device that supports 5G. This is not limited in embodiments of this application.

In embodiments of this application, an apparatus configured to implement a function of the network device may be a network device, or may be an apparatus, for example, a chip system or a processor, that can support the network device in implementing the function. The apparatus may be disposed in the network device. The technical solutions provided in embodiments of this application are described by using an example in which the apparatus configured to implement the function of the network device is a network device and the network device is a base station.

3. Wake-Up Signal (WUS)

The WUS may be a signal having a wake-up function, for example, a channel state information-reference signal (CSI-RS), a synchronization signal, a synchronization signal block (SSB), a demodulation reference signal (DMRS), or another newly designed signal. This is not limited.

The WUS is used to indicate the terminal device to receive, monitor, detect, or listen to (detect), on one or more paging occasions (POs), DCI for scheduling a paging message, namely, paging DCI. Alternatively, in other words, the WUS is used to indicate to monitor, on one or more POs, DCI used for paging. Alternatively, in other words, the WUS is used to indicate whether to monitor, on one or more POs, DCI used for paging. When the terminal device receives the WUS, it may be considered that the terminal is woken up by the WUS. The wake-up signal may also be referred to as an awakening signal, an activation signal, or the like.

For example, in a new radio (NR) system, a network device may send a paging message to a terminal device that is in idle mode, sleeping mode, or inactive mode. DCI for scheduling the paging message, namely, paging DCI, may be sent on a PO. The PO may be determined based on a paging search space and a corresponding control resource set. The paging search space is used to indicate a monitoring occasion of a PDCCH that carries the downlink control information. The PDCCH monitoring occasion may be periodic or aperiodic. This is not limited. The corresponding control resource set may be used to indicate a time-frequency resource of the PDCCH on the PDCCH monitoring occasion. One PO may include one or more PDCCH monitoring occasions. The plurality of PDCCH monitoring occasions may be consecutive or inconsecutive in time domain. This is not limited. The terminal device may determine a location of the PO based on an identifier of the terminal device (for example, a UE ID or a UE radio network temporary identifier (RNTI)), and receive, detect, monitor, or listen to the paging DCI on the PO. The terminal may receive the paging message and the like based on scheduling of the paging DCI. It should be noted that, in embodiments of this application, receiving, detection, monitoring, and listening are not distinguished from each other, and may be replaced with each other. For example, receiving may be replaced with detection, monitoring, or listening. For example, that the terminal device receives the WUS or the paging message may be replaced with that the terminal device detects the WUS or the paging message, or may be replaced with that the terminal device monitors the WUS or the paging message, or may be replaced with that the terminal device listens to the WUS or the paging message.

The WUS may be generated based on a sequence (for example, an m-sequence, a Gold sequence, or a ZC (Zadoff-Chu) sequence). The terminal device may detect the foregoing sequence signal by performing a simple cross-correlation operation, so that the detection is simple, and power consumption overheads are low.

The WUS may indicate wake-up in the following two manners.

In one manner, whether there is a WUS is used to indicate whether to wake the terminal device up. For example, the network device may indicate, by sending the WUS, to wake the terminal device up. Correspondingly, the terminal device wakes up when receiving the WUS. Alternatively, the network device may indicate, by not sending the WUS, not to wake the terminal device up. Correspondingly, the terminal device may continue to sleep or perform another operation when not receiving the WUS. For example, the terminal device may first determine whether the WUS is detected. If the terminal device detects the WUS, the terminal device receives, detects, monitors, or listens to, on one or more subsequent POs, DCI for scheduling a paging message, namely, paging DCI. The terminal may receive the paging message based on scheduling of the paging DCI. If the terminal device does not detect the WUS, the terminal device may continue to sleep on one or more subsequent POs, to reduce power consumption. For example, as shown in FIG. 1, if the terminal device detects the WUS, the terminal device may listen to the paging DCI on N subsequent POs, and receive the paging message based on scheduling of the paging DCI; or if the terminal device does not detect the WUS, the terminal device does not need to listen to the paging DCI and continues to sleep on N subsequent POs.

In the other manner, different WUSs indicate whether to wake the terminal device up. For example, a first WUS may indicate to wake the terminal device up, and a second WUS may indicate not to wake the terminal device up. The network device may indicate, by sending the first WUS, to wake the terminal device up. Correspondingly, the terminal device wakes up when receiving the first WUS. The network device may indicate, by sending the second WUS, not to wake the terminal device up. Correspondingly, the terminal device continues to sleep when receiving the second WUS. The first WUS and the second WUS may be distinguished from each other by using a sequence or a time-frequency transmission resource, or may be distinguished from each other in another distinguishing manner or the like. This is not limited in the present application provided that the terminal device can distinguish between the first WUS and the second WUS that are sent by the network device.

In an example, the WUS may occupy one or two physical resource blocks (PRBs) in frequency domain, and may occupy M subframes or slots in time domain. A value of M may be predefined, or may be configured by the network device for the terminal (for example, configured by using radio resource control (RRC) signaling).

4. Paging Occasion (PO)

One PO may include one or more physical downlink control channel (PDCCH) monitoring occasions. A PDCCH is used to carry downlink control information (DCI). The network device may send the DCI on a time-frequency resource corresponding to the PDCCH monitoring occasion. Correspondingly, the terminal device may detect or receive the DCI on the time-frequency resource corresponding to the PDCCH monitoring occasion. The time-frequency resource corresponding to the PDCCH monitoring occasion may include a paging search space and a control resource set (CORESET).

5. Quasi Co-Location (QCL)

QCL may indicate a relationship between two ports or a relationship between two signals. QCL between two signals from two ports indicates that the signals from the two ports have same attributes. These attributes include one or more of the following: an average gain, a spatial Rx parameter, a Doppler frequency shift, delay spread, and the like. In NR, QCL is classified into four types: QCL-A, QCL-B, QCL-C, and QCL-D. QCL-A indicates that ports or signals have a same Doppler frequency shift, same Doppler spread, a same average delay, and same delay spread. QCL-B indicates that ports or signals have a same Doppler frequency shift and a same Doppler spread parameter. QCL-C indicates that ports or signals have a same Doppler frequency shift and a same average delay parameter. QCL-D indicates that ports or signals have a same spatial Rx parameter.

If two signals are QCL, it may be equivalent to that the two signals are transmitted through a same port, or it is equivalent to that beams of the two signals are associated. For example, if a WUS and an SSB are QCL, it may be equivalent to that the WUS and the SSB are transmitted through a same port, or it is equivalent to that a beam of the WUS is associated with a beam of the SSB.

6. Synchronization Signal Block (SSB)

The SSB may include a primary synchronization signal (PSS), a secondary synchronization signal (SSS), and a physical broadcast channel (PBCH). The PSS and the SSS are used by the terminal device for synchronization, and the PBCH is used to carry a master information block (MIB) and the like.

7. Beam

The beam may be understood as a spatial domain filter, a spatial filter, a spatial parameter, or the like. A beam used to send a signal may be understood as a transmission beam (Tx beam), a spatial domain transmission filter, a spatial transmission parameter, or the like. A beam used to receive a signal may be understood as a reception beam (Rx beam), a spatial domain receive filter (spatial domain receive filter), a spatial RX parameter, or the like.

The transmission beam may be understood as distribution of signal strength formed in different directions in space after a signal is transmitted through an antenna, and the reception beam may be understood as distribution of signal strength, in different directions in space, of a radio signal received from an antenna.

In addition, the beam may be a wide beam, a narrow beam, a beam of another type, or the like. A technology for forming the beam may be a beamforming technology or another technology. This is not limited. For example, the beamforming technology may be a digital beamforming technology, an analog beamforming technology, or a hybrid digital/analog beamforming technology.

Optionally, a plurality of beams having a same communication feature or similar communication features may be considered as one beam. One beam may include one or more antenna ports, configured to transmit one or more of a data channel, a control channel, or a reference signal. The one or more antenna ports forming the beam may also be considered as one antenna port set.

The beam may correspond to a resource. For example, during beam measurement, the network device measures different beams by using different resources, and the terminal device feeds back measurement results, so that the network device can determine quality of corresponding beams. During beam measurement, one beam of the network device corresponds to one resource. Therefore, a beam corresponding to a resource may be identified by using an index of the resource. Alternatively, a beam may correspond to a reference signal, a synchronization signal, or a synchronization signal block SSB. For example, the network device sends different SSBs, for example, SSBs having different indexes, in different beam directions, and the terminal device measures and reports the SSBs. Results of measuring the SSBs by the terminal device may reflect quality of different beams sent by the network device to the terminal device.

Figure 5:
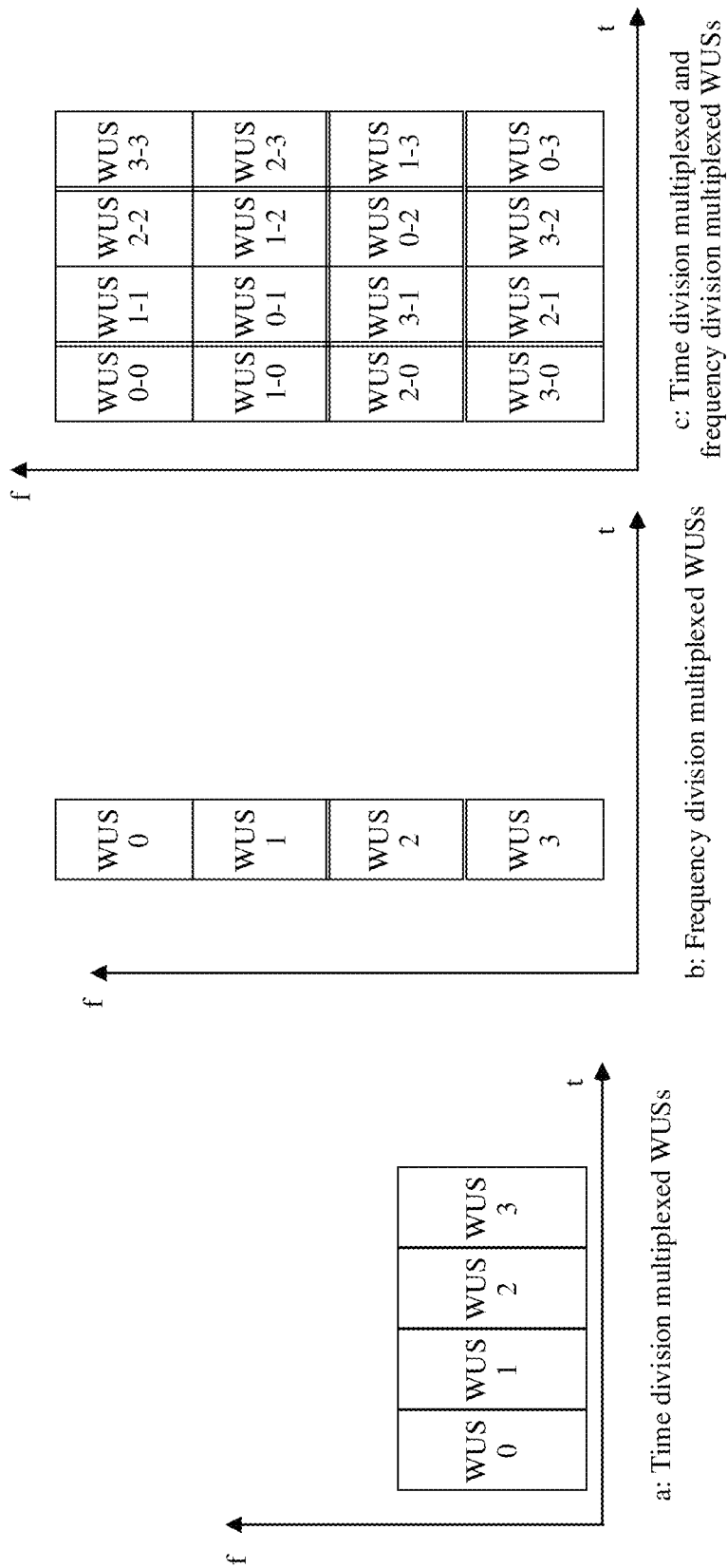
FIG. 5 is a schematic diagram of WUSs according to an embodiment of this application.

8. Combination of Time Division Multiplexing and Frequency Division Multiplexing The combination of time division multiplexing and frequency division multiplexing may also be referred to as time division multiplexing and frequency division multiplexing. The combination of time division multiplexing and frequency division multiplexing may mean that a same time domain resource is occupied and/or a same frequency domain resource is occupied. It should be noted that an object of the combination of time division multiplexing and frequency division multiplexing may be a signal, information, an occasion, a sequence, a preamble, or the like. This is not limited. WUSs shown in c in FIG. 5 are time division multiplexed and frequency division multiplexed. A WUS 0 includes four parts: a WUS 0-0, a WUS 0-1, a WUS 0-2, and a WUS 0-3. A WUS 1 includes four parts: a WUS 1-0, a WUS 1-1, a WUS 1-2, and a WUS 1-3. A WUS 2 includes four parts: a WUS 2-0, a WUS 2-1, a WUS 2-2, and a WUS 2-3. A WUS 3 includes four parts: a WUS 3-0, a WUS 3-1, a WUS 3-2, and a WUS 3-3. It can be learned from FIG. 5 that WUS parts arranged in columns on a vertical axis occupy a same time domain resource. For example, the WUS 0-0 to the WUS 3-0 occupy a same time domain resource. WUS parts arranged in rows on a horizontal axis occupy a same frequency domain resource. For example, the WUS 0-0, the WUS 1-1, the WUS 2-2, and the WUS 3-3 occupy a same frequency domain resource.

Figure 2:
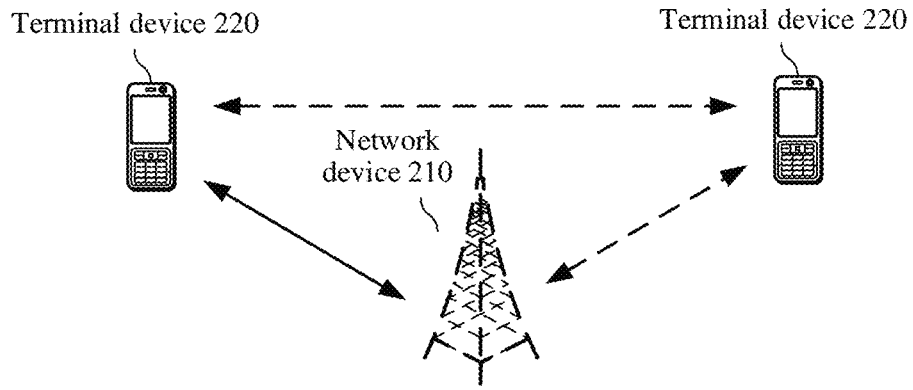
FIG. 2 is a schematic diagram of a communication system according to an embodiment of this application.

A method and an apparatus provided in embodiments of this application may be applied to a communication system. FIG. 2 is a schematic diagram of a structure of a communication system. The communication system 200 includes one or more network devices (only one network device 210 is shown in the figure for brevity), and one or more terminal devices that communicate with the one or more network devices. As shown in FIG. 2, the terminal device 220 communicates with the network device 210. It may be understood that the network device and the terminal device may also be referred to as communication devices.

In the communication system shown in FIG. 2, the network device 210 and the terminal device 220 may perform data transmission on a physical resource. The physical resource (which may also be referred to as a resource for short) in this application may include one or more of a time domain resource, a frequency domain resource, a code domain resource, or a spatial domain resource. For example, the time domain resource included in the physical resource may include at least one frame, at least one subframe, at least one slot, at least one mini-slot, at least one time unit, or at least one time domain symbol. For example, the frequency domain resource included in the physical resource may include at least one carrier, at least one component carrier (CC), at least one bandwidth part (BWP), at least one resource block group (RBG), at least one physical resource block group (PRG), at least one resource block (RB), or at least one subcarrier (SC). For example, the spatial domain resource included in the physical resource may include at least one beam, at least one port, at least one antenna port, or at least one layer/space layer. For example, the code domain resource included in the physical resource may include at least one sequence, at least one cyclic shift, at least one orthogonal cover code (OCC), or at least one non-orthogonal multiple access (NOMA) code. It may be understood that the physical resource may be a physical resource of a baseband, and the physical resource of the baseband may be used by a baseband chip. Alternatively, the physical resource may be a physical resource of an air interface (which may also be referred to as an air interface resource). Alternatively, the physical resource may be a physical resource of an intermediate frequency or a radio frequency.

When the network device 210 and the terminal device 220 perform data transmission, the network device 210 may send control information to the terminal device 220 through a control channel, for example, a physical downlink control channel (PDCCH), to allocate a resource of a data channel, for example, a physical downlink shared channel (PDSCH) or a physical uplink shared channel (PUSCH), to the terminal device 220. For example, the control information may indicate a time domain symbol and/or a resource block (RB) corresponding to the resource of the data channel. The network device 210 and the terminal device 220 perform data transmission on the allocated resource through the data channel. The data transmission may include downlink data transmission and/or uplink data transmission, and the downlink data (for example, data carried in the PDSCH) transmission may be that the network device 210 sends data to the terminal device 220. The uplink data (for example, data carried on the PUSCH) transmission may be that the terminal device 220 sends data to the network device 210. The data may be data in a broad sense, for example, may be user data, system information, broadcast information, or other information. This is not limited.

The terminal devices 220 may also communicate with each other, which may be generally referred to as device-to-device (D2D) communication. Data transmitted between the terminal devices 220 may be referred to as sidelink data or the like.

FIG. 2 shows one network device and two terminal devices as an example. Optionally, the communication system 200 may include a plurality of network devices, and another quantity of terminal devices may be included in coverage of one network device. This is not limited in this embodiment of this application.

Figure 3:
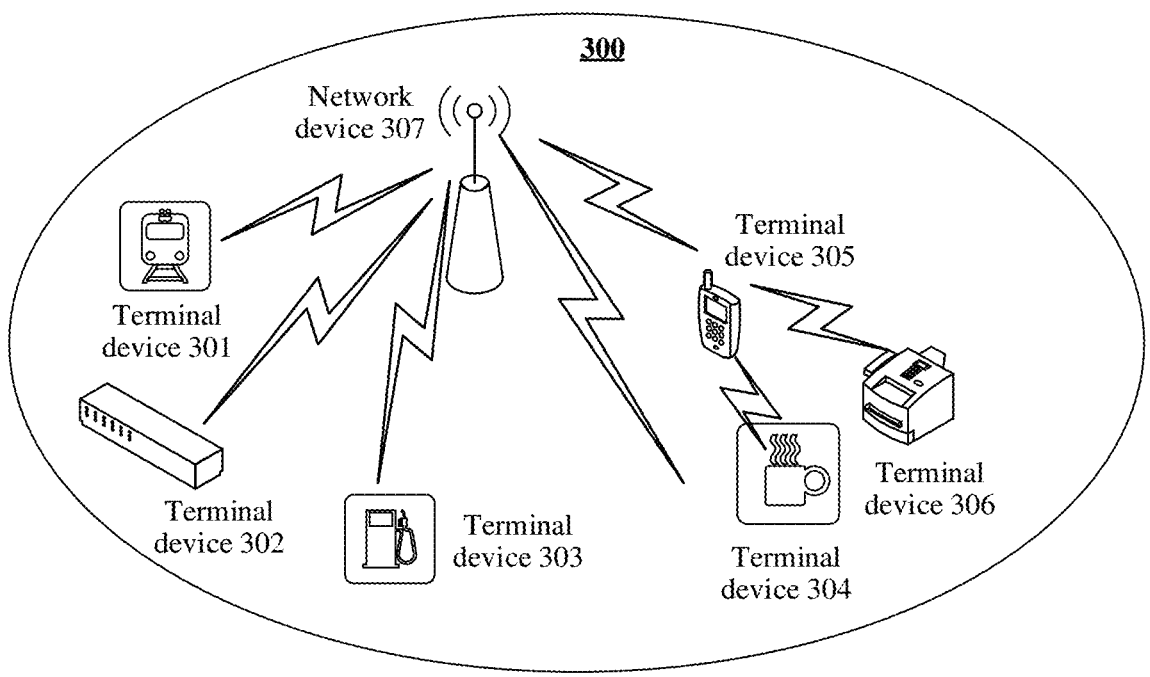
FIG. 3 is a schematic diagram of another communication system according to an embodiment of this application.

FIG. 3 shows another communication system 300 to which an embodiment of this application is applied. The communication system 300 includes a terminal device 301, a terminal device 302, a terminal device 303, a terminal device 304, a terminal device 305, a terminal device 306, and a network device 307.

In the communication system 300, at least one of the terminal device 301, the terminal device 302, the terminal device 303, the terminal device 304, the terminal device 305, or the terminal device 306 may send uplink data to the network device 307. The network device 307 may send downlink data to at least one of the terminal device 301, the terminal device 302, the terminal device 303, the terminal device 304, the terminal device 305, or the terminal device 306.

In the communication system, D2D communication may also be performed between the terminal devices. For example, the terminal device 305 may send sidelink data to the terminal device 304 and/or the terminal device 306, and the terminal device 304 and/or the terminal device 306 may send sidelink data to the terminal device 305.

The network device 307 may directly communicate with the terminal device 301 to the terminal device 306. For example, during downlink transmission, the network device 307 may directly send downlink data to at least one of the terminal device 301, the terminal device 302, the terminal device 303, or the terminal device 305. During uplink transmission, at least one of the terminal device 301, the terminal device 302, the terminal device 303, or the terminal device 305 may directly send uplink data to the network device 307. Alternatively, the network device 307 may indirectly communicate with the terminal device 301 to the terminal device 306. For example, the network device 307 may send data to the terminal device 305, and the terminal device 305 may forward the data to the terminal device 304 and the terminal device 306. Similarly, the terminal device 304 and the terminal device 306 may send data to the terminal device 305, and the terminal device 305 forwards the data to the network device 307 and the like.

FIG. 3 shows one network device and six terminal devices as an example. Optionally, the communication system 300 may include a plurality of network devices, and another quantity of terminal devices may be included in coverage of one network device. This is not limited in this embodiment of this application.

Based on the communication system shown in FIG. 2 or FIG. 3, embodiments of this application provide a communication method and an apparatus. A principle of the method is: There is a correspondence between a wake-up signal and a PDCCH monitoring occasion. A terminal device receives a wake-up signal, and then detects, on a PDCCH monitoring occasion that corresponds to the wake-up signal and that is in a paging occasion PO, DCI used to schedule a paging message. The DCI may also be referred to as paging DCI. If the terminal does not receive the wake-up signal, the terminal remains in sleeping mode. Detection of the wake-up signal is easy to implement and requires low power consumption. Therefore, compared with a case in which the terminal device periodically detects the paging DCI on the PDCCH monitoring occasion in the paging occasion PO regardless of whether the terminal device receives the wake-up signal, this can reduce power consumption of the terminal device.

The technologies described in embodiments of this application may be applied to various communication systems, for example, a 4th generation (4G) communication system, a 4.5G communication system, a 5G communication system, a system converged by a plurality of communication systems, and a future evolved communication system (for example, a 6G communication system). The communication systems include, for example, a long term evolution (LTE) system, a new radio (NR) system, an internet of things system, an internet of vehicles system, a wireless fidelity (Wi-Fi) system, a communication system related to the 3rd generation partnership project (3GPP), and another communication system of this type.

Figure 4:
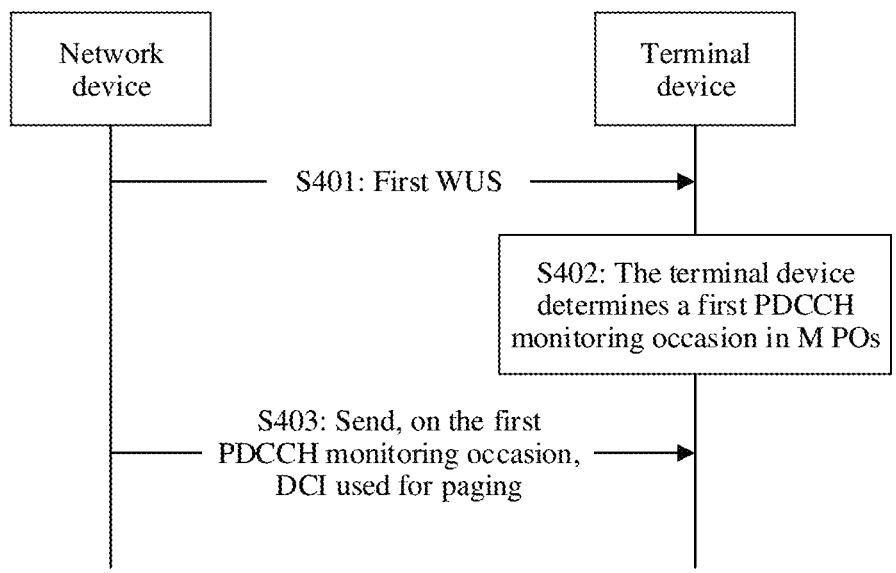
FIG. 4 is a schematic flowchart of a communication method according to an embodiment of this application.

As shown in FIG. 4, a procedure of a communication method is provided. The procedure is executed by a terminal device and a network device. The terminal device may be the terminal device 220 in FIG. 2, and the network device may be the network device 210 in FIG. 2. Alternatively, the terminal device may be at least one of the terminal device 301 to the terminal device 306 in FIG. 3, and the network device may be the network device 307 in FIG. 3. It may be understood that the terminal device in the method may alternatively be a component (for example, a processor, a chip, or a chip system) of the terminal device, and the network device in the method may alternatively be a component (for example, a processor, a chip, or a chip system) of the network device. The procedure includes the following steps.

S401: The network device sends a first WUS, and the terminal device receives the first WUS.

Optionally, the first WUS may be one of K WUSs, and K is an integer greater than or equal to 1.

For example, in a possible implementation, K is an integer greater than or equal to 2. Refer to b in FIG. 5. Frequency division multiplexing may be used between the K WUSs. For example, the K WUSs occupy a same time domain resource but different frequency domain resources, and the frequency domain resources occupied by the WUSs may have a same size or different sizes. An advantage of sending the K WUSs by using frequency division multiplexing is as follows: In a design of frequency division multiplexing, the WUSs may be sent in narrow bandwidth, so that the terminal device can detect the WUSs in the narrow bandwidth. This helps reduce detection complexity.

Alternatively, refer to a in FIG. 5. Time division multiplexing may be used between the K WUSs. For example, the K WUSs occupy a same frequency domain resource but different time domain resources, and the time domain resources occupied by the WUSs may have a same size or different sizes. An advantage of sending the K WUSs by using time division multiplexing is as follows: In a design of time division multiplexing, the WUSs may be sent in some bandwidth, so that the terminal device can receive and detect different WUSs in the fixed bandwidth. In this way, the terminal device performs beam training or channel measurement based on the WUSs.

Alternatively, refer to c in FIG. 5. A combination of time division multiplexing and frequency division multiplexing may be used between the K WUSs. An advantage of sending the K WUSs by using the combination of time division multiplexing and frequency division multiplexing is as follows: The terminal device may select one WUS to perform narrowband receiving. However, when the terminal device needs to receive WUSs from different locations at different time points, the terminal device may receive and detect the WUSs in a broadband manner, to perform beam training or channel measurement within a range of the broadband. In this way, the terminal device can select, based on a requirement of the terminal device, an appropriate manner of receiving the WUSs. This improves flexibility of WUS detection.

Optionally, one of the K WUSs may occupy X time units in time domain, where a unit of the time unit may be a symbol, a slot, or the like; and may occupy Y frequency domain units in frequency domain, where a unit of the frequency domain unit may be a subcarrier, a resource block (RB), or the like. X and Y are integers greater than or equal to 1. The time units occupied by the WUS may be consecutive or inconsecutive in time domain. The frequency domain units occupied by the WUS may be consecutive or inconsecutive in frequency domain.

Optionally, a time domain resource occupied by a WUS may be directly proportional to a subcarrier spacing. For example, if a subcarrier spacing of a WUS is $15 \cdot 2^u$ kHz, where u=0, 1, 2, . . . , a time domain resource occupied by the WUS may include $L \cdot 2^u$ time units, where L is an integer greater than or equal to 1. For example, when a subcarrier spacing of a WUS is 15 kHz, a time domain resource occupied by the WUS may include L time units. When a subcarrier spacing of a WUS is 30 kHz, a time domain resource occupied by the WUS may include 2*L time units. An advantage of such a design is as follows: Absolute time lengths of the WUSs are the same regardless of values of subcarrier spacings. In this way, when there is a difference between timing of the terminal device and timing of the network device, synchronization timing can be performed by using the WUSs having the same absolute time length, and there is no need to design different timing capability requirements for the WUSs having different subcarrier spacings. Therefore, the terminal may not need to adjust a radio signal receiving time point based on the different subcarrier spacings of the WUSs. This simplifies implementation of the terminal.

Figure 6:
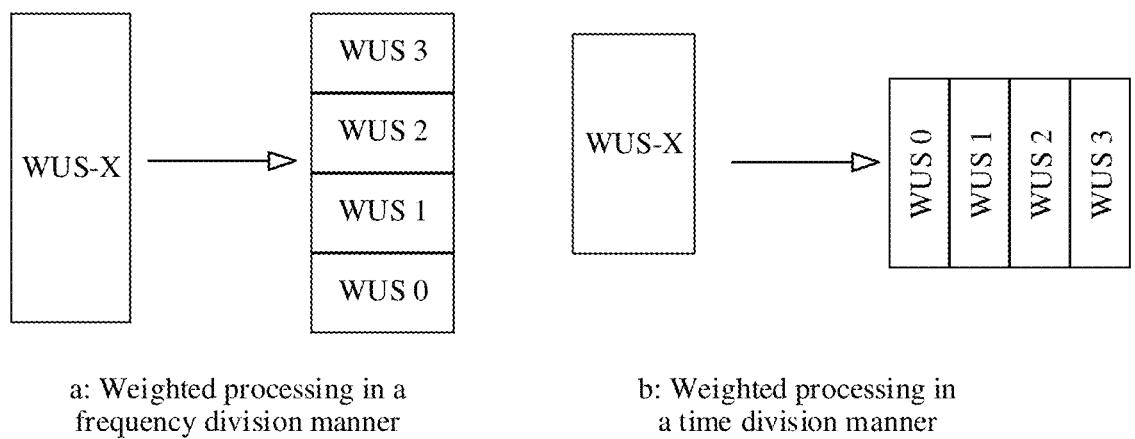
FIG. 6 is a schematic diagram of other WUSs according to an embodiment of this application.

Optionally, the K WUSs may be generated based on different sequences. For example, the K WUSs may be generated based on K sequences. For example, the network device may generate the K sequences. The sequences may be m-sequences, Gold sequences, ZC sequences, or the like. Initial phases, initial values, or root sequences of the K sequences are different from each other. The K WUSs may be generated based on the K sequences. Alternatively, the K WUSs may be generated based on a same sequence. For example, the network device may generate one sequence. The sequence may be an m-sequence, a Gold sequence, a ZC sequence, or the like. Then, different weighted processing is performed on K parts of the sequence to obtain the K WUSs. Alternatively, in other words, the K WUSs are generated based on K parts of a same WUS. For example, the network device may perform different precoding on the K parts of the WUS to obtain the K WUSs. The following uses an example in which weighting processing is performed on four parts of a WUS-X to obtain four WUSs for description. As shown in a in FIG. 6, the WUS_X may be divided into four parts in frequency domain, and weighted processing is separately performed on the four parts of the WUS to obtain four WUSs. Alternatively, refer to b in FIG. 6. The WUS-X may be divided into four parts in time domain, and weighted processing is separately performed on the four parts of the WUS to obtain four WUSs.

S402: The terminal device determines a first PDCCH monitoring occasion in M POs, where M is an integer greater than or equal to 1.

In a possible implementation, after receiving the first WUS in S401, the terminal device may determine the first PDCCH monitoring occasion in the M POs based on the first WUS, where there is a correspondence between the first WUS and the first PDCCH monitoring occasion. For example, after receiving the first WUS, the terminal device may determine the first PDCCH monitoring occasion based on the correspondence between the first WUS and the first PDCCH monitoring occasion. The correspondence between the first WUS and the first PDCCH monitoring occasion may be predefined, or may be configured by the network device. For example, the network device may configure the correspondence between the first WUS and the first PDCCH monitoring occasion for the terminal device by using radio resource control (RRC) signaling or system information.

That there is a correspondence between the first WUS and the first PDCCH monitoring occasion may include one or more of the following: There is a correspondence between a time domain resource of the first WUS and the first PDCCH monitoring occasion; there is a correspondence between a frequency domain resource of the first WUS and the first PDCCH monitoring occasion; there is a correspondence between a code domain resource of the first WUS and the first PDCCH monitoring occasion; there is a correspondence between a spatial domain resource of the first WUS and the first PDCCH monitoring occasion; there is a correspondence between a sequence of the first WUS and the first PDCCH monitoring occasion; there is a correspondence between an identifier of the first WUS and the first PDCCH monitoring occasion; or the like.

It can be learned from the foregoing descriptions that the correspondence between the first WUS and the first PDCCH monitoring occasion may meet one or more of the foregoing conditions. When one of the foregoing conditions is met, the terminal device may determine, in the following manner, the first PDCCH monitoring occasion corresponding to the first WUS.

In a manner in which there is a correspondence between the time domain resource of the first WUS and the first PDCCH monitoring occasion, after receiving the first WUS in S401, the terminal device may determine, based on the time domain resource occupied by the first WUS, the first PDCCH monitoring occasion corresponding to the first WUS.

In a manner in which there is a correspondence between the frequency domain resource of the first WUS and the first PDCCH monitoring occasion, after receiving the first WUS in S401, the terminal device may determine, based on the frequency domain resource occupied by the first WUS, the first PDCCH monitoring occasion corresponding to the first WUS.

In a manner in which there is a correspondence between the spatial domain resource of the first WUS and the first PDCCH monitoring occasion, after receiving the first WUS in S401, the terminal device may determine, based on the spatial domain resource occupied by the first WUS, the first PDCCH monitoring occasion corresponding to the first WUS.

In a manner in which there is a correspondence between the sequence of the first WUS and the first PDCCH monitoring occasion, after receiving the first WUS in S401, the terminal device may determine, based on the sequence of the first WUS, the first PDCCH monitoring occasion corresponding to the first WUS.

In a manner in which there is a correspondence between the identifier of the first WUS and the first PDCCH monitoring occasion, after receiving the first WUS in S401, the terminal device may determine, based on the identifier of the first WUS, the first PDCCH monitoring occasion corresponding to the first WUS.

When the correspondence between the first WUS and the first PDCCH monitoring occasion meets more of the foregoing conditions, the terminal device may determine, in the following manners, the first PDCCH monitoring occasion corresponding to the first WUS.

In a manner in which there is a correspondence between the time domain resource and the frequency domain resource of the first WUS and the first PDCCH monitoring occasion, after receiving the first WUS in S401, the terminal device may determine, based on the time domain resource and the frequency domain resource occupied by the first WUS, the first PDCCH monitoring occasion corresponding to the first WUS.

In a manner in which there is a correspondence between the time domain resource, the frequency domain resource, and the sequence of the first WUS and the first PDCCH monitoring occasion, after receiving the first WUS in S401, the terminal device may determine, based on the sequence of the first WUS and the time domain resource and the frequency domain resource occupied by the first WUS, the first PDCCH monitoring occasion corresponding to the first WUS.

In a manner in which there is a correspondence between the time domain resource, the frequency domain resource, and the identifier of the first WUS and the first PDCCH monitoring occasion, after receiving the first WUS in S401, the terminal device may determine, based on the identifier of the first WUS and the time domain resource and the frequency domain resource occupied by the first WUS, the first PDCCH monitoring occasion corresponding to the first WUS.

Optionally, a frequency domain resource occupied by a WUS is the same as a frequency domain resource occupied by a CORESET corresponding to a PDCCH monitoring occasion (which may also be understood as a PDCCH monitoring occasion that has a correspondence with the WUS) corresponding to the WUS. For example, in the foregoing descriptions, if there is a correspondence between the first WUS and the first PDCCH monitoring occasion, the frequency domain resource occupied by the first WUS may be the same as a frequency domain resource occupied by a CORESET corresponding to the first PDCCH monitoring occasion.

Optionally, there is a correspondence between a WUS and a PO. It may be understood that one PO may include one or more PDCCH monitoring occasions.

Figure 11:
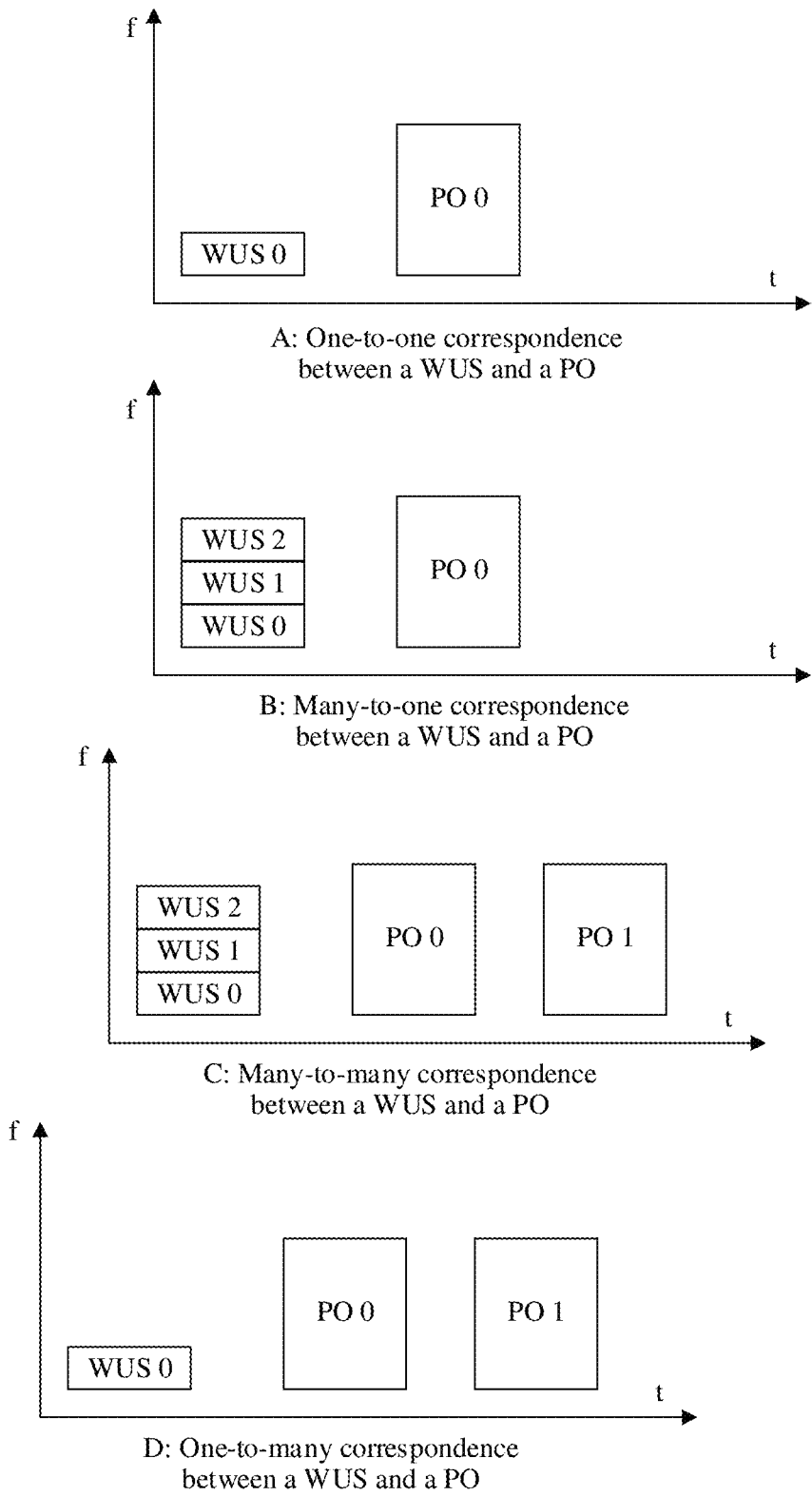
FIG. 11 is a schematic diagram of a correspondence between a WUS and a PO according to an embodiment of this application.

For example, the correspondence between a WUS and a PO may be one-to-one, that is, one WUS corresponds to one PO. As shown in A in FIG. 11, a WUS 0 may correspond to a PO 0. After receiving the first WUS in S401, the terminal device may determine one PO based on a correspondence between the first WUS and the PO. For example, the first WUS may be the WUS 0 shown in A in FIG. 11, and the PO may be the PO 0 shown in A in FIG. 11.

Alternatively, for example, the correspondence between a WUS and a PO may be many-to-one, that is, a plurality of WUSs correspond to one PO. As shown in B in FIG. 11, there may be a correspondence between a WUS 0, a WUS 1, and a WUS 2 and a PO 0. After receiving the first WUS in S401, the terminal device may determine one PO based on the correspondence. For example, the first WUS may be one of the WUS 0, the WUS 1, or the WUS 2 shown in B in FIG. 11, and the PO may be the PO 0.

Alternatively, for example, the correspondence between a WUS and a PO may be many-to-many, that is, a plurality of WUSs correspond to a plurality of POs. As shown in C in FIG. 11, there is a correspondence between a WUS 0, a WUS 1, and a WUS 2 and a PO 0 and a PO 1. After receiving the first WUS in S401, the terminal device may determine a plurality of POs based on the correspondence. For example, the first WUS may be one of the WUS 0, the WUS 1, or the WUS 2 shown in C in FIG. 11, and the plurality of POs may include the PO 0 and the PO 1.

Alternatively, for example, the correspondence between a WUS and a PO may be one-to-many, that is, one WUS corresponds to a plurality of POs. As shown in D in FIG. 11, there is a correspondence between a WUS 0 and a PO 0 and a PO 1. After receiving the first WUS in S401, the terminal device may determine a plurality of POs based on the correspondence. For example, the first WUS may be the WUS 0 shown in D in FIG. 11, and the plurality of POs may include the PO 0 and the PO 1.

Optionally, there is a correspondence between a WUS and a PDCCH monitoring occasion. It may be understood that a PDCCH monitoring occasion may be included in a PO.

Figure 12:
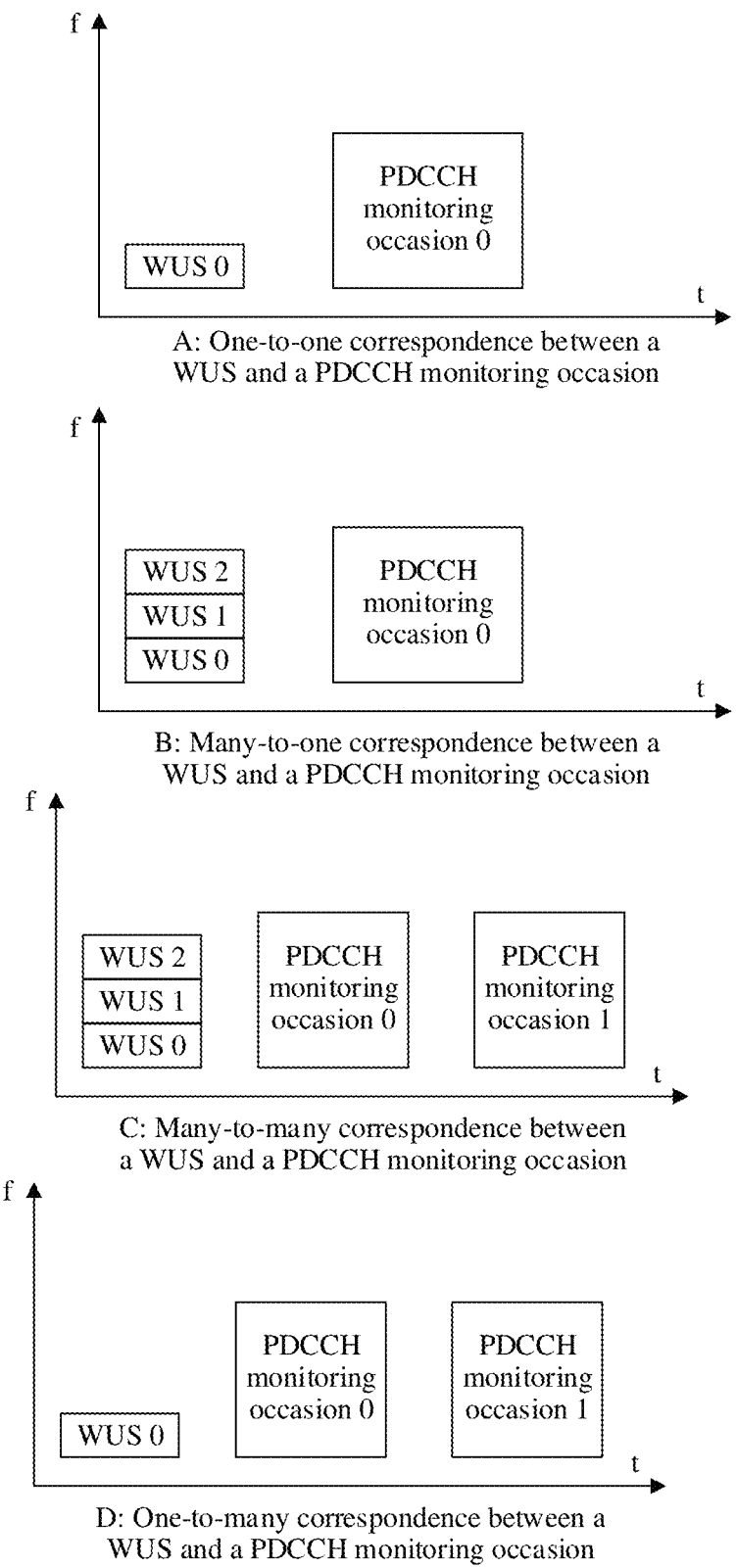
FIG. 12 is a schematic diagram of a correspondence between a WUS and a PDCCH monitoring occasion according to an embodiment of this application.

For example, the correspondence between a WUS and a PDCCH monitoring occasion is one-to-one, that is, one WUS corresponds to one PDCCH monitoring occasion. As shown in A in FIG. 12, a WUS 0 corresponds to a PDCCH monitoring occasion 0. After receiving the first WUS in S401, the terminal device may determine one PDCCH monitoring occasion based on a correspondence between the first WUS and the PDCCH monitoring occasion. For example, the first WUS may be the WUS 0 shown in A in FIG. 12, and the PDCCH monitoring occasion may be the PDCCH monitoring occasion 0 shown in A in FIG. 12.

Alternatively, for example, the correspondence between a WUS and a PDCCH monitoring occasion is many-to-one, that is, a plurality of WUSs correspond to one PDCCH monitoring occasion. As shown in B in FIG. 12, a WUS 0, a WUS 1, and a WUS 2 correspond to a PDCCH monitoring occasion 0. After receiving the first WUS in S401, the terminal device may determine one PDCCH monitoring occasion based on the correspondence. For example, the first WUS may be the WUS 0, the WUS 1, or the WUS 2 shown in B in FIG. 12, and the PDCCH monitoring occasion may be the PDCCH monitoring occasion 0.

Alternatively, for example, the correspondence between a WUS and a PDCCH monitoring occasion is many-to-many, that is, a plurality of WUSs correspond to a plurality of PDCCH monitoring occasions. As shown in C in FIG. 12, there is a correspondence between a WUS 0, a WUS 1, and a WUS 2 and a PDCCH monitoring occasion 0 and a PDCCH monitoring occasion 1. After receiving the first WUS in S401, the terminal device may determine a plurality of PDCCH monitoring occasions based on the correspondence. For example, the first WUS may be the WUS 0, the WUS 1, or the WUS 2 shown in C in FIG. 12, and the plurality of PDCCH monitoring occasions may include the PDCCH monitoring occasion 0 and the PDCCH monitoring occasion 1.

Alternatively, for example, the correspondence between a WUS and a PDCCH monitoring occasion is one-to-many, that is, one WUS correspond to a plurality of PDCCH monitoring occasions. As shown in D in FIG. 12, there is a correspondence between a WUS 0 and a PDCCH monitoring occasion 0 and a PDCCH monitoring occasion 1. After receiving the first WUS in S401, the terminal device may determine a plurality of PDCCH monitoring occasions based on the correspondence. For example, the first WUS may be the WUS 0 shown in D in FIG. 12, and the plurality of PDCCH monitoring occasions may include the PDCCH monitoring occasion 0 and the PDCCH monitoring occasion 1.

S403: The network device sends, on the first PDCCH monitoring occasion, DCI used for paging, and the terminal device receives, on the first PDCCH monitoring occasion, the DCI used for paging.

After receiving the DCI used for paging, the terminal device may receive a paging message on a PDSCH based on scheduling of the paging DCI. Optionally, the paging message includes a paging list. The terminal device may determine whether the paging list includes an identifier of the terminal device. If the paging list includes the identifier of the terminal device, it indicates that the network device is paging the terminal device. In this case, the terminal device may initiate random access. If the paging list does not include the identifier of the terminal device, the terminal device may continue to sleep, so that power consumption overheads of the terminal device are reduced.

In the procedure shown in FIG. 4, a sequence of S401 to S403 is not limited. The sequence in FIG. 4 is merely an example for description. For example, occurrence time of S403 may be earlier than occurrence time of S402, or occurrence time of S403 may be later than occurrence time of S402. This is not limited. Optionally, before S401, the method may further include: The network device generates the first WUS. Before S403, the method may further include: The network device generates the DCI used for paging, and the like.

In the procedure shown in FIG. 4, the K WUSs may be quasi co-located with K SSBs. A quasi co-location relationship between the WUSs and the SSBs may be a one-to-one relationship, a one-to-many relationship, a many-to-one relationship, or the like. This is not limited. In this embodiment of this application, an example in which the quasi co-location relationship between the WUSs and the SSBs is one-to-one is used for description.

In a possible implementation, the network device sends the K SSBs. Optionally, the K SSBs may correspond to different beam directions. If the terminal device detects that received signal strength of an SSB in the K SSBs meets a condition (for example, the received signal strength of the SSB is the greatest), it indicates that the terminal device is probably in the beam direction. In this case, the terminal device may adjust and/or optimize a reception beam of the terminal device, to improve quality of receiving the SSB. The terminal device may receive, by using the optimized and/or adjusted beam, a WUS that is quasi co-located with the SSB, so that received signal quality of the WUS is improved, and a probability of missed detection or false detection of the WUS is reduced. Alternatively, if the terminal device does not have a beam adjustment capability, for example, performs omnidirectional reception through a single antenna, the terminal device may obtain at least received signal strength of a beam corresponding to each SSB, and determine an SSB whose received signal strength meets a condition. The SSB that meets the condition may be an SSB whose received signal strength is the greatest, an SSB whose received signal strength exceeds a threshold, or the like. It should be noted that, in this embodiment of this application, the received signal strength may be replaced with received signal power, received signal quality, or the like. This is not limited.

The quasi co-location relationship between the K WUSs and the K SSBs may be predefined, or may be configured by the network device. This is not limited. For example, in an implementation, the network device may include, in configuration information of a WUS, indication information of an SSB that is quasi co-located with the WUS, or may include, in configuration information of an SSB, indication information of a WUS that is quasi co-located with the SSB. This is not limited. For example, configuration information of a WUS includes a time domain resource, a frequency domain resource, or a sequence of the WUS, and may further include indication information of a quasi co-located SSB. The indication information of the quasi co-located SSB may be an index of the quasi co-located SSB, or the like. Alternatively, configuration information of an SSB includes a time domain resource, a frequency domain resource, or a sequence of the SSB, and may further include indication information of a quasi co-located WUS.

Figure 7:
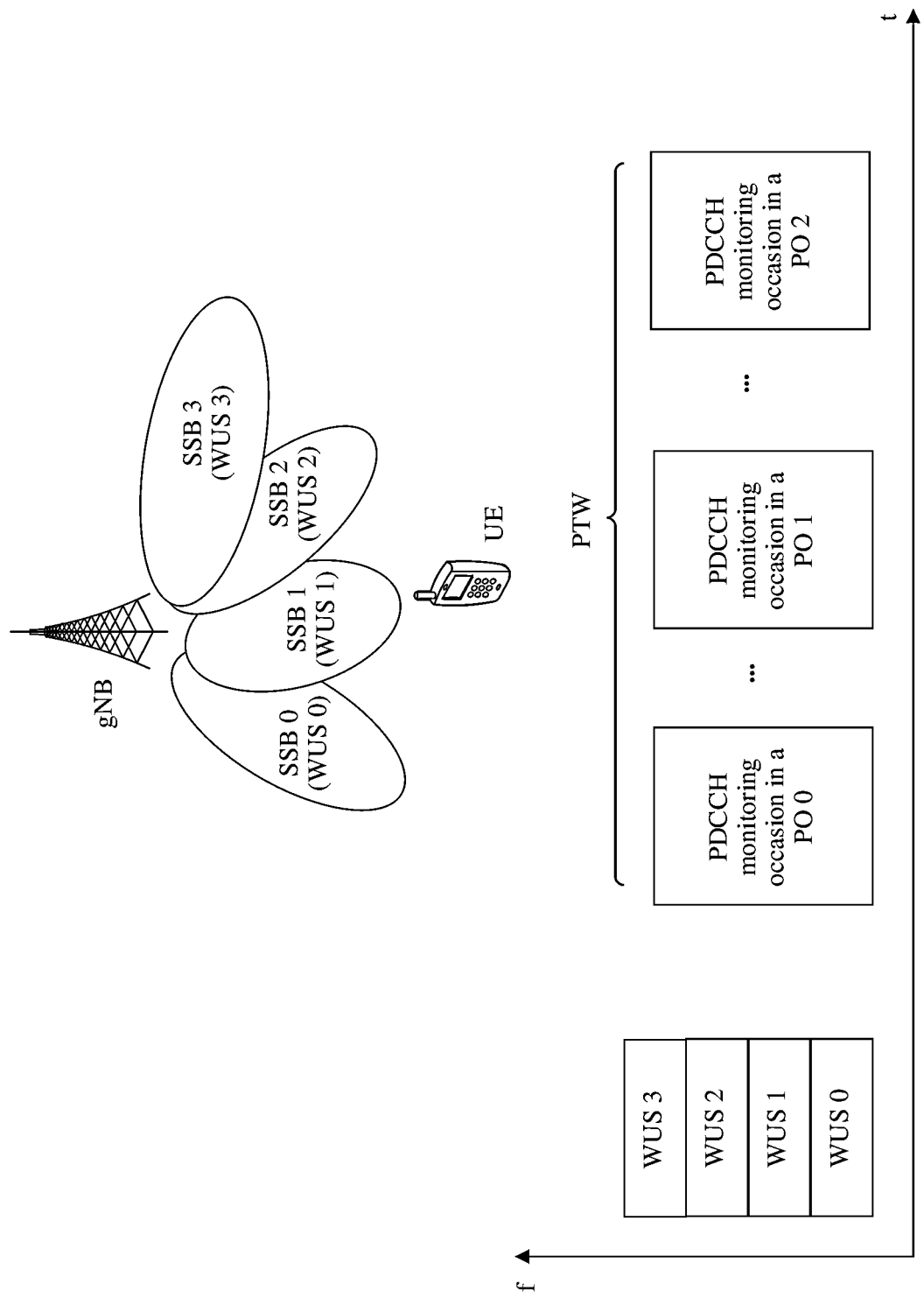
FIG. 7 is a schematic diagram in which a WUS is quasi co-located with an SSB according to an embodiment of this application.

As shown in FIG. 7, an example in which K is 4 is used for description. The network device sends four SSBs, and the four SSBs have different beam directions. The four SSBs are quasi co-located with four WUSs respectively. For example, a WUS 0 is quasi co-located with an SSB 0, a WUS 1 is quasi co-located with an SSB 1, a WUS 2 is quasi co-located with an SSB 2, and a WUS 3 is quasi co-located with an SSB 3. It can be learned from FIG. 7 that, because the terminal device is located in a beam direction of the SSB 1, received signal strength of the SSB 1 for the terminal device is probably higher than received signal strength of another SSB. In a possible solution, the terminal device may adjust and/or optimize a reception beam of the terminal device, so that quality of receiving the SSB 1 is optimal. In addition, the terminal device receives, by using the adjusted and/or optimized beam, the WUS 1 that is quasi-co-located with the SSB 1, so that a probability of missed detection and false detection of the WUS is reduced.

Refer to the example shown in FIG. 7. The network device may send the four WUSs before a paging time window (PTW) in a frequency division manner. If the terminal device detects any WUS (for example, the WUS may be the WUS 1), the terminal device needs to detect paging DCI on a plurality of POs in the PTW. Alternatively, in other words, there is a correspondence between the four WUSs and the plurality of POs in the PTW. For example, one PO may include one or more PDCCH monitoring occasions. The terminal device may detect the paging DCI on one or more PDCCH monitoring occasions in a PO 0. The paging DCI may be scrambled by using a paging radio network temporary identifier (P-RNTI). If the terminal device detects the paging DCI on the PDCCH monitoring occasions in the PO 0, the terminal device receives a paging message based on scheduling of the paging DCI. If the terminal device does not detect the paging DCI on the PDCCH monitoring occasions in the PO 0, the terminal device continues to detect the paging DCI on a subsequent PO 1 and a subsequent PO 2. The rest can be deduced by analogy. It should be noted that the PTW may include the plurality of POs. Alternatively, in other words, the PTW may include a set of the plurality of POs. The plurality of POs in the PTW may be directly replaced with the plurality of POs corresponding to the WUSs, or the like. This is not limited.

It can be learned from the foregoing descriptions that the terminal device may adjust, based on the quasi co-location relationship between the WUSs and the SSBs, a beam used to receive a WUS, so that received signal strength of the WUS is improved, and a probability of missed detection or false detection of the WUS is reduced.

Alternatively, in the procedure in FIG. 4, the K WUSs may be quasi co-located with K channel state information-reference signals (CSI-RSs), and the CSI-RSs are used for channel state measurement. Compared with the foregoing SSB, the CSI-RS may have a narrower beam range and a higher beam gain. A quasi co-location relationship between the WUSs and the CSI-RSs may be one-to-one, one-to-many, or many-to-one. In this embodiment of this application, an example in which the quasi co-location relationship between the WUSs and the CSI-RSs is one-to-one is used for description. The quasi co-location relationship between the WUSs and the CSI-RSs may be predefined, or may be configured by the network device. This is not limited.

In a possible implementation, the CSI-RS may be common to a cell, and configuration information corresponding to the CSI-RS may be included in a system message. Alternatively, the CSI-RS may be common to a terminal group, and configuration information corresponding to the CSI-RS may be included in a system message or RRC signaling. Alternatively, the CSI-RS may be specific to a terminal, and configuration information of the CSI-RS may be included in RRC signaling.

Because a same CSI-RS common to a cell is used for all terminal devices in the cell, configuration information of the CSI-RS may be sent in a broadcast manner in the system message. This is mainly because the WUS is sent for a purpose of "receiving by all the terminal devices within coverage of the cell". Therefore, there is no need to separately configure the CSI-RS for each terminal device, so that overheads caused by sending the configuration information can be reduced. Similarly, because a same CSI-RS common to a terminal group is used for all terminal devices in the terminal group, configuration information of the CSI-RS may also be sent in a broadcast manner in the system message. Alternatively, the CSI-RS may be separately configured for each terminal device. For example, the CSI-RS is separately configured for each terminal device by using RRC signaling. This is not limited.

Figure 8:
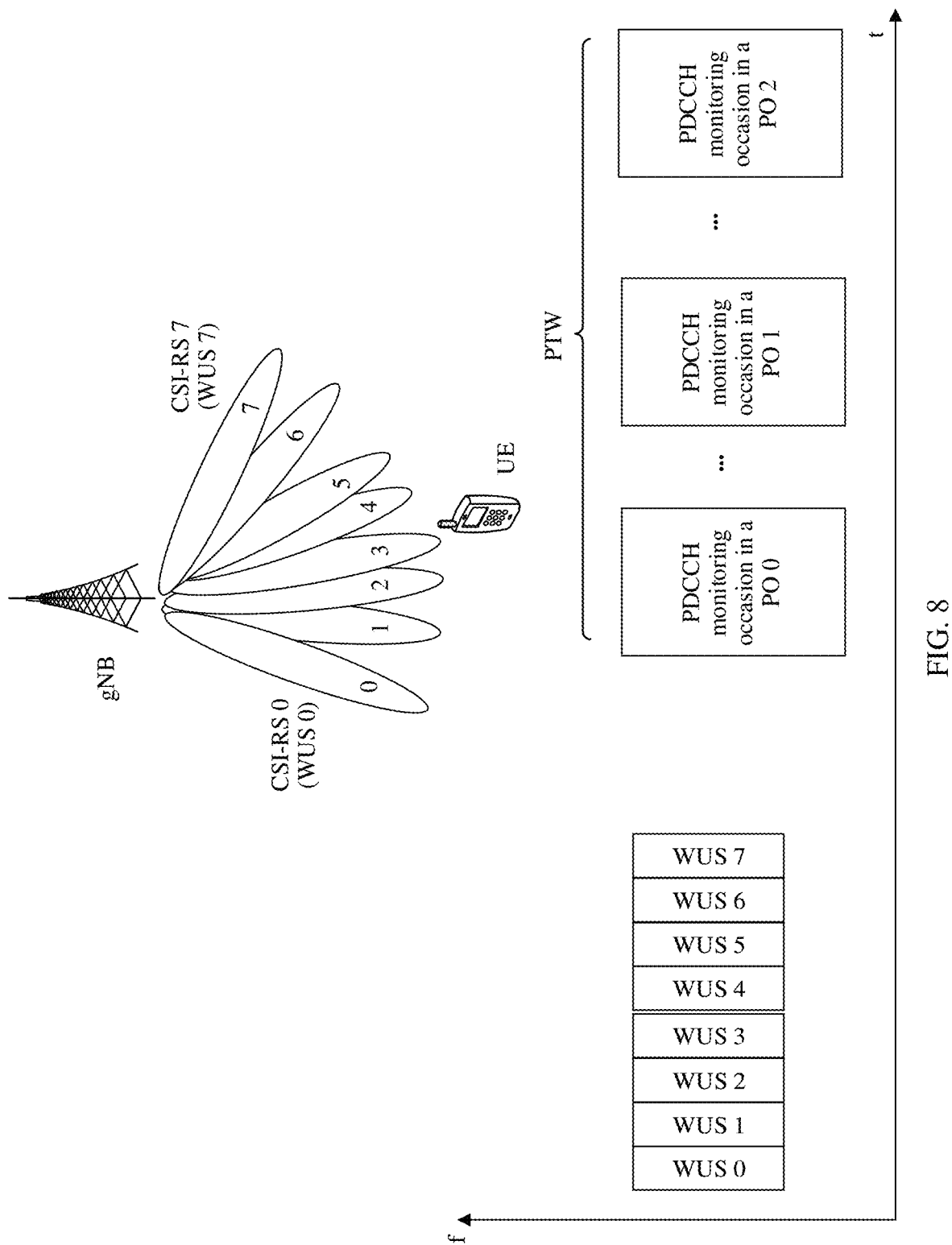
FIG. 8 is a schematic diagram in which a WUS is quasi co-located with a CSI-RS according to an embodiment of this application.

As shown in FIG. 8, an example in which K is 8 is used for description. The network device may send eight WUSs in a time division manner, and indexes of the eight WUSs are sequentially 0 to 7. The eight WUSs are quasi co-located with eight CSI-RSs respectively.

In a possible implementation, the network device sends the eight CSI-RSs, and the eight CSI-RSs have different beam directions. Because the terminal device is located in a beam direction of a CSI-RS 3, received signal strength of the CSI-RS 3 received by the terminal device is probably higher than that of another CSI-RS. The terminal device may adjust and/or optimize a reception beam of the terminal device, so that quality of receiving the CSI-RS 3 by the terminal device is optimal. Then, the terminal device may receive, by using the adjusted and/or optimized beam, the WUS 3 that is quasi-co-located with the CSI-RS 3, so that a probability of missed detection and false detection of the WUS is reduced.

In another possible implementation, the network device may send the eight WUSs, and the eight WUSs have different beam directions. Because the terminal device is located in a beam direction of the WUS 3, received signal strength of the WUS 3 received by the terminal device is probably higher than that of another WUS. Because the WUS 3 is quasi-co-located with the CSI-RS 3, a measurement result of the WUS 3 may reflect a measurement result of the CSI-RS 3. In this embodiment of this application, after receiving the WUS 3, the terminal device may perform channel state measurement based on the WUS 3 and report the measurement result. Alternatively, although the terminal device is located in a beam direction of the WUS 3, received signal quality strength of the WUS 3 is higher than that of another WUS. However, the terminal device may alternatively receive another WUS in the eight WUSs. Therefore, the terminal device may alternatively perform channel state measurement based on all or some of the eight WUSs, and report measurement results. Optionally, the terminal device may report a measurement result in one or more of the following manners.

(1) Separately report measurement results of the WUSs. For example, eight channel measurement results may be respectively reported for the eight WUSs.

(2) Use measurement results of the WUSs to replace results of next latest CSI-RS measurement for reporting. For example, measurement results of the WUS 0 to the WUS 7 may be respectively used as results of next measurement of a CSI-RS 0 to a CSI-RS 7 for reporting.

(3) Perform comprehensive processing (for example, averaging or filtering processing) on measurement results of the WUSs and measurement results of other CSI-RSs, and then report the measurement results. For example, measurement results of the WUS 0 to the WUS 7 and the CSI-RS 0 to the CSI-RS 7 may be respectively averaged or filtered, and then reported.

In the foregoing manner, by reporting the measurement results of the WUSs, the terminal device does not need to wait for subsequent CSI-RSs to start channel measurement, so that the network device can learn of a channel status of the terminal device more quickly, and optimize a resource and beam scheduling policy in a timely manner. This improves spectrum utilization.

Still refer to the example shown in FIG. 8. After the network device sends the eight WUSs, if the terminal device detects any WUS (for example, the WUS 3), the terminal device may detect paging DCI on a plurality of POs corresponding to the eight WUSs. For example, one PO may include one or more PDCCH monitoring occasions. The terminal device may detect, on one or more PDCCH monitoring occasions in a PO 0, the paging DCI scrambled by using a P-RNTI. If the terminal device detects the paging DCI, the terminal device receives a paging message based on scheduling of the paging DCI. If the terminal device does not detect the paging DCI, the terminal device continues to detect the paging DCI on a subsequent PO 1 and a subsequent PO 2. The rest can be deduced by analogy. According to the foregoing method, the WUSs are quasi co-located with the CSI-RSs, and channel measurement results of the WUSs are reported, so that the network device can quickly learn of the channel state of the terminal device. This optimizes resource scheduling.

Alternatively, in the procedure shown in FIG. 4, the K WUSs may be quasi co-located with K demodulation reference signals (DMRSs). The DMRS may be used to demodulate DCI used to schedule a paging message, or may be used to demodulate a paging message. A quasi co-location relationship between the WUSs and the DMRSs may be one-to-one, one-to-many, or many-to-one. In this embodiment of this application, an example in which the quasi co-location relationship between the WUSs and the DMRSs is one-to-one is used for description. The quasi co-location relationship between the WUSs and the DMRSs may be predefined, or may be configured by the network device.

In a possible implementation, there may be a correspondence between the K WUSs and M POs. One of the M POs includes one or more PDCCH monitoring occasions, and a time-frequency resource corresponding to a PDCCH monitoring occasion carries a DMRS. The K WUSs may be quasi co-located with K DMRSs in the PO. For example, after receiving a WUS, the terminal device may adjust and/or optimize a reception beam of the WUS, to achieve optimal receiving quality. Then, the terminal device receives, by using the adjusted and/or optimized beam, DCI used for scheduling a paging message and a DMRS that is quasi co-located with the WUS, so that a probability of missed detection and false detection of the DCI and/or the DMRS is reduced.

Figure 9:
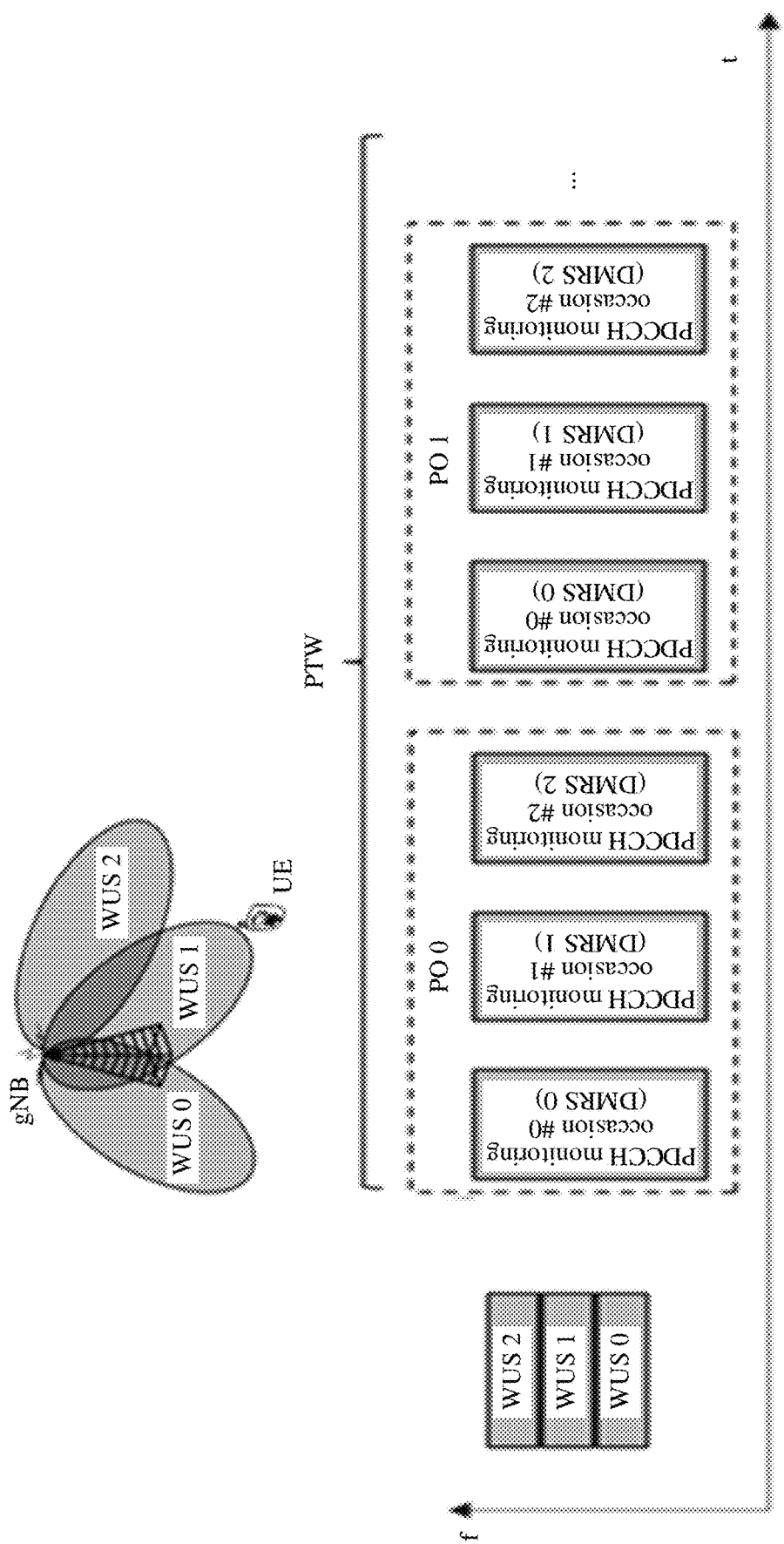
FIG. 9 is a schematic diagram in which a WUS is quasi co-located with a DMRS according to an embodiment of this application.

As shown in FIG. 9, an example in which K is 3 and M is 2 is used for description. The network device may send a WUS 0, a WUS 1, and a WUS 2 in a frequency division manner. The three WUSs may correspond to two POs. Each PO may include three PDCCH monitoring occasions, and a time-frequency resource corresponding to a PDCCH monitoring occasion may be used to carry a DMRS. For example, a time-frequency resource corresponding to a PDCCH monitoring occasion #0 may be used to carry a DMRS 0, a time-frequency resource corresponding to a PDCCH monitoring occasion #1 may be used to carry a DMRS 1, and a time-frequency resource corresponding to a PDCCH monitoring occasion #2 may be used to carry a DMRS 2. The three WUSs sent by the network device may be quasi co-located with the three DMRSs respectively. For example, the WUS 0 is quasi co-located with the DMRS 0, the WUS 1 is quasi co-located with the DMRS 1, and the WUS 2 is quasi co-located with the DMRS 2.

After the network device sends three WUSs, because the terminal device is located in a beam direction of the WUS 1, received signal strength of the WUS 1 for the terminal device is probably higher than that of another WUS. The terminal device may determine the PDCCH monitoring occasion #1 corresponding to the WUS 1, and then detect paging DCI on the PDCCH monitoring occasion #1 in the PO 0. If the terminal device detects the paging DCI, the terminal device demodulates the paging DCI by using the DMRS 1. If the terminal device does not detect the paging DCI, the terminal device continues to detect the paging DCI on a PO 1. The rest can be deduced by analogy. Alternatively, the terminal device may receive and buffer information on the PDCCH monitoring occasion #1 in the PO 0 and the PDCCH monitoring occasion #1 in the PO 1, and then detect the paging DCI in the buffered information. For example, the terminal device may detect the paging DCI on the PDCCH monitoring occasion #1 in the PO 0 and the PDCCH monitoring occasion #1 in the PO 1 in a time sequence.

According to the foregoing method, the terminal device may optimize, based on the quasi co-location relationship between the WUSs and the DMRSs, the reception beam on the PDCCH monitoring occasion, so that quality of the DCI and/or the DMRS transmitted on the PDCCH monitoring occasion is improved.

In a possible implementation, the WUS in this embodiment of this application may be a CSI-RS that has a function of indicating whether the terminal device is to detect the paging DCI. In other words, the WUS in this embodiment of this application may be a CSI-RS, and the CSI-RS has a function of indicating whether the terminal device is to detect the paging DCI. In this case, in this embodiment of this application, configuration information of a CSI-RS may be reused for configuration information, for example, time-frequency resource information or generation sequence information, of a WUS, and a CSI-RS sending and detection method may also be reused for a WUS sending and detection method. This reduces implementation complexity of the network device and the terminal device. It should be noted that in FIG. 7, FIG. 8, and FIG. 9, an example in which the network device is a gNB and the terminal device is UE is used for description.

An embodiment of this application further provides a communication method. A principle of the method is: There is a correspondence between a wake-up signal and a paging occasion. A terminal device receives a wake-up signal, and then detects, on a paging occasion that corresponds to the wake-up signal, DCI used to schedule a paging message, namely, paging DCI. If the terminal device does not receive the wake-up signal, the terminal device remains in sleeping mode. Compared with a case in which the terminal device periodically detects the paging DCI on the paging occasion regardless of whether the terminal device receives the wake-up signal, this can reduce power consumption of the terminal device.

Figure 10:
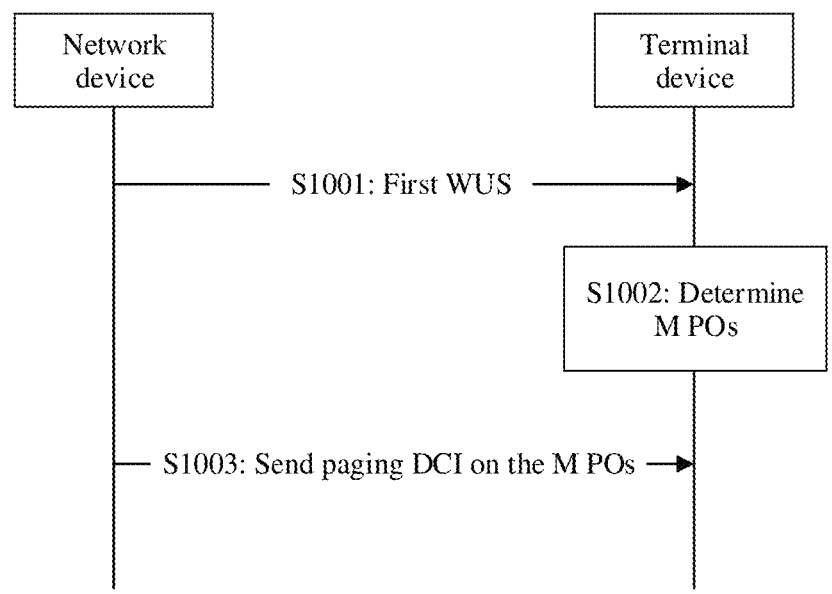
FIG. 10 is a schematic flowchart of another communication method according to an embodiment of this application.

As shown in FIG. 10, a procedure of a communication method is provided. The procedure is executed by a terminal device and a network device. The terminal device may be the terminal device 220 in FIG. 2, and the network device may be the network device 210 in FIG. 2. Alternatively, the terminal device may be at least one of the terminal device 301 to the terminal device 306 in FIG. 3, and the network device may be the network device 307 in FIG. 3. It may be understood that the terminal device in the method may alternatively be a component (for example, a processor, a chip, or a chip system) of the terminal device, and the network device in the method may alternatively be a component (for example, a processor, a chip, or a chip system) of the network device. The procedure includes the following steps.

S1001: The network device sends a first WUS. Correspondingly, the terminal device receives the first WUS.

Optionally, the first WUS is one of K WUSs, and K is an integer greater than or equal to 1. For example, in a possible implementation, K is an integer greater than or equal to 2. Frequency division multiplexing, time division multiplexing, or a combination of time division multiplexing and frequency division multiplexing may be used between the K WUSs. For example descriptions of time division multiplexing, frequency division multiplexing, and the combination of time division multiplexing and frequency division multiplexing that are used between the K WUSs, refer to the descriptions in the embodiment shown in FIG. 4. Details are not described herein again.

Optionally, the K WUSs in FIG. 10 may be generated based on a same sequence or different sequences. For an example manner of generating the K WUSs, refer to the descriptions in the embodiment shown in FIG. 4. Details are not described herein again.

Optionally, in FIG. 10, the K WUSs may be quasi co-located with K SSBs, or the K WUSs may be quasi co-located with K CSI-RSs, or the K WUSs may be quasi co-located with K DMRSs. For example descriptions in which the K WUSs are quasi co-located with the K SSBs, the K CSI-RSs, or the K DMRSs, refer to the descriptions in the embodiment shown in FIG. 4. Details are not described herein again.

S1002: The terminal device determines M paging occasions POs, where there is a correspondence between the K WUSs and the M POs, and M is an integer greater than or equal to 1.

For example, the terminal device may determine the M POs based on the K WUSs.

Optionally, one of the M POs includes K PDCCH monitoring occasions, and there may be a correspondence between a PDCCH monitoring occasion and a WUS. For example, there may be a correspondence between a first PDCCH monitoring occasion and the first WUS. For the correspondence between a PDCCH monitoring occasion and a WUS, refer to the descriptions in the embodiment shown in FIG. 4. Details are not described herein again.

Optionally, in S1001, after receiving the first WUS, the terminal device may determine the first PDCCH monitoring occasion based on the correspondence between the first WUS and the first PDCCH monitoring occasion. Correspondingly, in the following S1003, the network device may send paging DCI on the first PDCCH monitoring occasion in at least one of the M POs. Correspondingly, the terminal device receives the paging DCI on the first PDCCH monitoring occasion.

That there is a correspondence between the first WUS and the first PDCCH monitoring occasion may include one or more of the following: There is a correspondence between a time domain resource of the first WUS and the first PDCCH monitoring occasion; there is a correspondence between a frequency domain resource of the first WUS and the first PDCCH monitoring occasion; there is a correspondence between a code domain resource of the first WUS and the first PDCCH monitoring occasion; there is a correspondence between a spatial domain resource of the first WUS and the first PDCCH monitoring occasion; there is a correspondence between a sequence of the first WUS and the first PDCCH monitoring occasion; or there is a correspondence between an identifier of the first WUS and the first PDCCH monitoring occasion.

S1003: The network device sends the paging DCI on the M POs. Correspondingly, the terminal device receives the paging DCI on the M POs.

According to the foregoing method, after receiving the first WUS, the terminal device performs an operation of detecting the paging DCI on the paging occasions POs. Compared with an operation of periodically detecting the paging DCI by the terminal device, this can reduce power consumption of the terminal device.

Corresponding to the method provided in the foregoing method embodiments, an embodiment of this application further provides a corresponding apparatus. The apparatus includes a corresponding module configured to perform the foregoing embodiments. The module may be software, hardware, or a combination of software and hardware.

Figure 13:
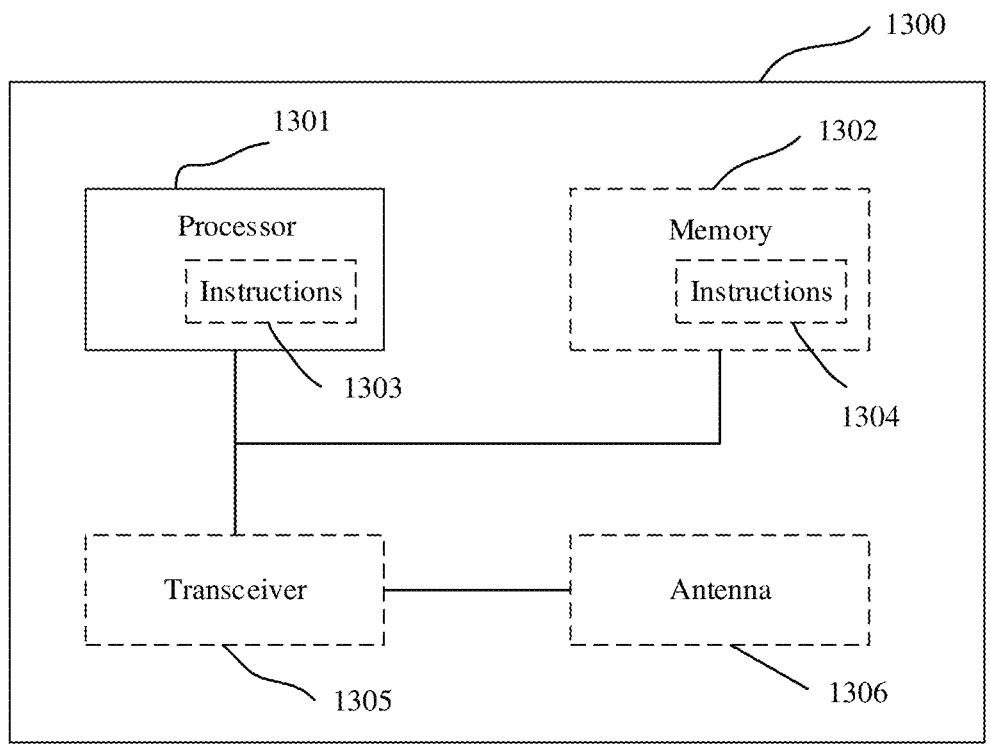
FIG. 13 is a schematic diagram of an apparatus according to an embodiment of this application.

FIG. 13 is a schematic diagram of a structure of an apparatus. The apparatus 1300 may be a network device; may be a terminal device; may be a chip, a chip system, a processor, or the like that supports the network device in implementing the foregoing method; or may be a chip, a chip system, a processor, or the like that supports the terminal device in implementing the foregoing method. The apparatus may be configured to implement the method described in the foregoing method embodiments. For details, refer to the descriptions in the foregoing method embodiments.

The apparatus 1300 may include one or more processors 1301. The processor 1301 may also be referred to as a processing unit, and can implement a specific control function. The processor 1301 may be a general-purpose processor, a dedicated processor, or the like. For example, the processor 1301 may be a baseband processor or a central processing unit. The baseband processor may be configured to process a communication protocol and communication data. The central processing unit may be configured to: control a communication apparatus (for example, a base station, a baseband chip, a terminal, a terminal chip, a DU, or a CU), execute a software program, and process data of the software program.

In a possible design, the processor 1301 may alternatively store instructions and/or data 1303, and the instructions and/or data 1303 may be run by the processor 1301, to enable the apparatus 1300 to perform the method described in the foregoing method embodiments.

In another possible design, the processor 1301 may include a transceiver unit configured to implement receiving and sending functions. For example, the transceiver unit may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In still another possible design, the apparatus 1300 may include a circuit, and the circuit may implement the sending, receiving, or communication function in the foregoing method embodiments.

Optionally, the apparatus 1300 may include one or more memories 1302. The memory may store instructions 1304, and the instructions may be run on the processor, to enable the apparatus 1300 to perform the method described in the foregoing method embodiments. Optionally, the memory may further store data. Optionally, the processor may also store instructions and/or data. The processor and the memory may be separately disposed, or may be integrated together. For example, the correspondence described in the foregoing method embodiments may be stored in the memory or stored in the processor.

Optionally, the apparatus 1300 may further include a transceiver 1305 and/or an antenna 1306. The processor 1301 may be referred to as a processing unit, and controls the apparatus 1300. The transceiver 1305 may be referred to as a transceiver unit, a transceiver circuit, a transceiver apparatus, a transceiver module, or the like, and is configured to implement sending and receiving functions.

Optionally, the apparatus 1300 in this embodiment of this application may be configured to perform the method described in FIG. 4 or FIG. 10 in embodiments of this application, or may be configured to perform a method in which the methods described in the foregoing two or more figures are combined with each other.

The processor and the transceiver that are described in this application may be implemented on an integrated circuit (IC), an analog IC, a radio frequency integrated circuit RFIC, a hybrid signal IC, an application-specific integrated circuit (ASIC), a printed circuit board (PCB), an electronic device, or the like. The processor and the transceiver may also be fabricated by using various IC process technologies, for example, a complementary metal oxide semiconductor 0, an n-type metal oxide semiconductor 0, a p-type metal oxide semiconductor (PMOS), a bipolar junction transistor (BJT), a bipolar CMOS (BiCMOS), silicon germanium (SiGe), and gallium arsenide (GaAs).

The apparatus described in the foregoing embodiments may be a network device or a terminal device. However, a range of the apparatus described in this application is not limited thereto, and a structure of the apparatus may not be limited to FIG. 13. The apparatus may be an independent device, or may be a part of a larger device. For example, the apparatus may be:

(1) an independent integrated circuit IC, a chip, or a chip system or subsystem;
(2) a set of one or more ICs, where optionally, the IC set may further include a storage component configured to store data and/or instructions;
(3) an ASIC, for example, a modem (MSM);
(4) a module that can be embedded in another device;
(5) a receiver, a terminal, an intelligent terminal, a cellular phone, a wireless device, a handheld device, a mobile unit, a vehicle-mounted device, a network device, a cloud device, an artificial intelligence device, a machine device, a home device, a medical device, an industrial device, or the like; or
(6) others, or the like.

Figure 14:
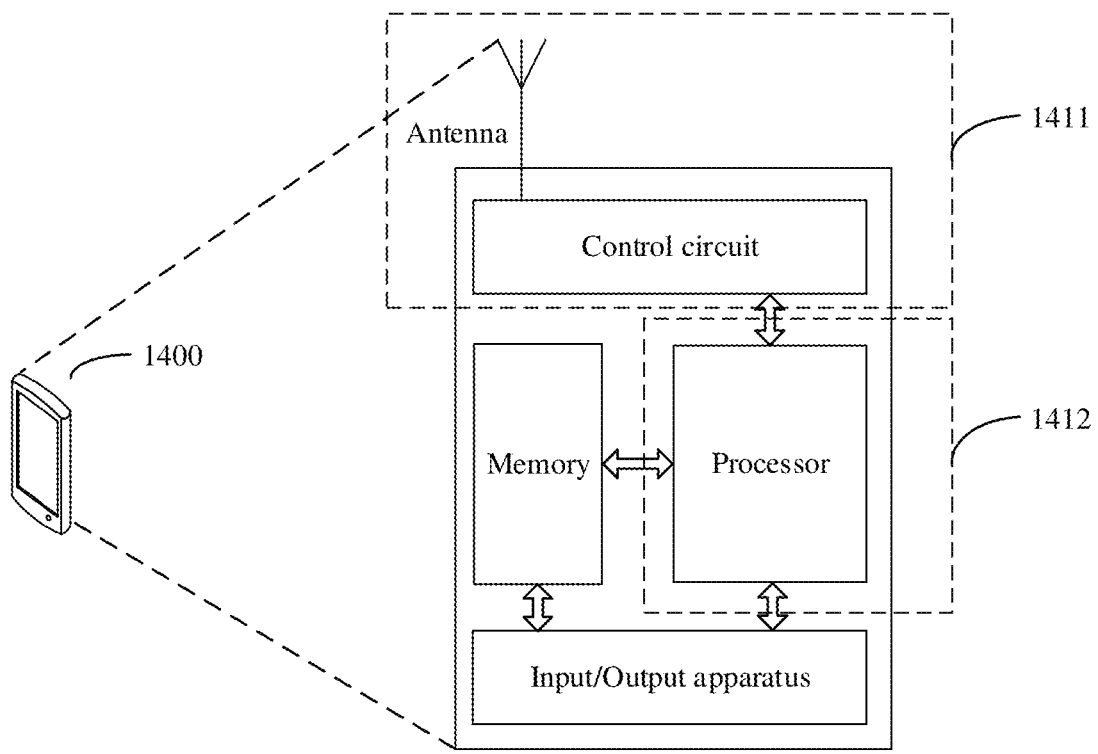
FIG. 14 is a schematic diagram of another apparatus according to an embodiment of this application.

FIG. 14 is a schematic diagram of a structure of a terminal device. The terminal device is applicable to the scenario shown in FIG. 1 or FIG. 2. For ease of description, FIG. 14 shows only main components of the terminal device. As shown in FIG. 14, the terminal device 1400 includes a processor, a memory, a control circuit, an antenna, and an input/output apparatus. The processor is mainly configured to: process a communication protocol and communication data, control the entire terminal, execute a software program, and process data of the software program. The memory is mainly configured to store the software program and the data. A radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus, for example, a touchscreen, a display, or a keyboard, is mainly configured to: receive data entered by a user and output data to the user.

After the terminal device is powered on, the processor may read a software program in a storage unit, parse and execute instructions of the software program, and process data of the software program. When data needs to be sent in a wireless manner, the processor performs baseband processing on the to-be-sent data, and outputs a baseband signal to the radio frequency circuit. The radio frequency circuit processes the baseband signal to obtain a radio frequency signal, and sends the radio frequency signal in a form of an electromagnetic wave through the antenna. When data is sent to the terminal device, the radio frequency circuit receives a radio frequency signal through the antenna, further converts the radio frequency signal into a baseband signal, and outputs the baseband signal to the processor. The processor converts the baseband signal into data, and processes the data.

For ease of description, FIG. 14 shows only one memory and one processor. In an actual terminal device, there may be a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process the communication protocol and the communication data. The central processing unit is mainly configured to: control the entire terminal device, execute the software program, and process the data of the software program. The processor in FIG. 14 integrates functions of the baseband processor and the central processing unit. A person skilled in the art may understand that the baseband processor and the central processing unit may alternatively be separate processors, and are interconnected by using a technology such as a bus. A person skilled in the art may understand that the terminal device may include a plurality of baseband processors to adapt to different network standards, the terminal device may include a plurality of central processing units to enhance a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program. The processor executes the software program to implement a baseband processing function.

In an example, the antenna and the control circuit that have sending and receiving functions may be considered as a transceiver unit 1411 of the terminal device 1400, and the processor having a processing function may be considered as a processing unit 1412 of the terminal device 1400. As shown in FIG. 14, the terminal device 1400 includes the transceiver unit 1411 and the processing unit 1412. The transceiver unit may also be referred to as a transceiver, a transceiver apparatus, or the like. Optionally, a component that is in the transceiver unit 1411 and that is configured to implement a receiving function may be considered as a receiving unit, and a component that is in the transceiver unit 1411 and that is configured to implement a sending function may be considered as a sending unit. In other words, the transceiver unit 1411 includes the receiving unit and the sending unit. For example, the receiving unit may also be referred to as a receiver or a receiver circuit, and the sending unit may be referred to as a transmitter or a transmitter circuit. Optionally, the receiving unit and the sending unit may be one integrated unit, or may be a plurality of independent units. The receiving unit and the sending unit may be in one geographical location, or may be distributed in a plurality of geographical locations.

Figure 15:
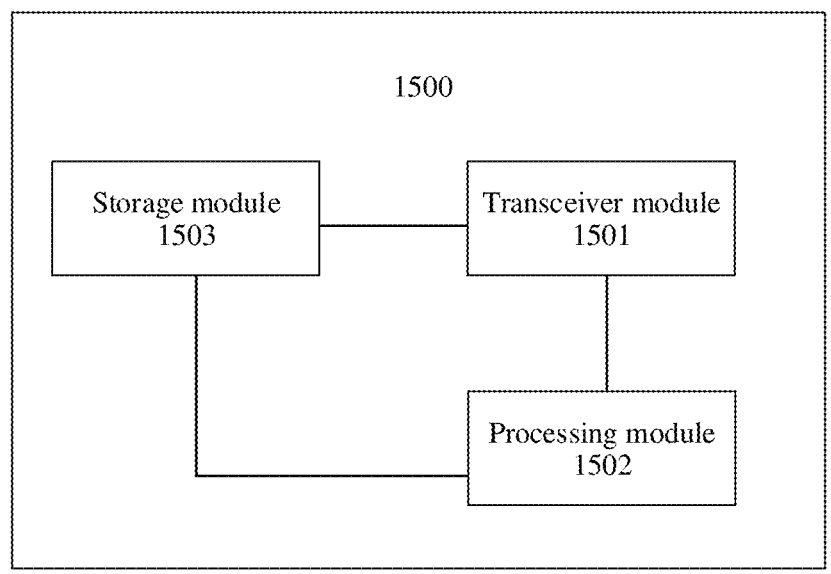
FIG. 15 is a schematic diagram of still another apparatus according to an embodiment of this application.

As shown in FIG. 15, another embodiment of this application provides an apparatus 1500. The apparatus may be a terminal, or may be a component (for example, an integrated circuit or a chip) of the terminal. Alternatively, the apparatus may be a network device, or may be a component (for example, an integrated circuit or a chip) of the network device. Alternatively, the apparatus may be another communication module configured to implement the methods in the method embodiments of this application. The apparatus 1500 may include a processing module 1502 (or referred to as a processing unit). Optionally, the apparatus 1500 may further include a transceiver module 1501 (or referred to as a transceiver unit) and a storage module 1503 (or referred to as a storage unit).

In a possible design, one or more modules in FIG. 15 may be implemented by one or more processors, may be implemented by one or more processors and one or more memories, may be implemented by one or more processors and one or more transceivers, or may be implemented by one or more processors, one or more memories, and one or more transceivers. This is not limited in this embodiment of this application. The processor, the memory, and the transceiver may be disposed separately, or may be integrated.

The apparatus has a function of implementing the terminal described in embodiments of this application. For example, the apparatus includes a corresponding module, unit, or means used for the terminal to perform the steps that are related to the terminal and that are described in embodiments of this application. The function, the unit, or the means may be implemented by software or hardware, may be implemented by hardware executing corresponding software, or may be implemented by a combination of software and hardware. For details, refer to the corresponding descriptions in the foregoing corresponding method embodiments. Alternatively, the apparatus has a function of implementing the network device described in embodiments of this application. For example, the apparatus includes a corresponding module, unit, or means used for the network device to perform the steps that are related to the network device and that are described in embodiments of this application. The function, the unit, or the means may be implemented by software or hardware, may be implemented by hardware executing corresponding software, or may be implemented by a combination of software and hardware. For details, refer to the corresponding descriptions in the foregoing corresponding method embodiments.

Optionally, the modules in the apparatus 1500 in this embodiment of this application may be configured to perform the method described in FIG. 4 or FIG. 10 in embodiments of this application, or may be configured to perform a method in which the methods described in the foregoing two or more figures are combined with each other.

In a possible design, the apparatus 1500 may include a processing module 1502 and a transceiver module 1501. The apparatus 1500 is configured to perform an operation on a terminal device side in the method described in FIG. 4.

The transceiver module 1501 is configured to receive a first wake-up signal, where the first wake-up signal is one of K wake-up signals, and K is an integer greater than or equal to 1. The processing module 1502 is configured to determine a first physical downlink control channel PDCCH monitoring occasion in M paging occasions, where there is a correspondence between the first wake-up signal and the first PDCCH monitoring occasion, and M is an integer greater than or equal to 1. The transceiver module 1501 is further configured to receive, on the first PDCCH monitoring occasion, downlink control information DCI used for paging.

Optionally, there is a correspondence between the K wake-up signals and the M paging occasions.

Optionally, one of the M paging occasions includes K PDCCH monitoring occasions, and the first PDCCH monitoring occasion is one of the K PDCCH monitoring occasions.

Optionally, the K wake-up signals are quasi co-located with K synchronization signal blocks SSBs, the K wake-up signals are quasi co-located with K channel state information-reference signals CSI-RSs, or the K wake-up signals are quasi co-located with K demodulation reference signals DMRSs.

Optionally, the K wake-up signals are generated based on a same sequence.

Optionally, that K is an integer greater than or equal to 1 is specifically: K is an integer greater than or equal to 2.

Optionally, the K wake-up signals occupy different frequency domain resources, or the K wake-up signals occupy different time domain resources.

Optionally, that there is a correspondence between the first wake-up signal and the first PDCCH monitoring occasion includes one or more of the following: There is a correspondence between a time domain resource of the first wake-up signal and the first PDCCH monitoring occasion; there is a correspondence between a frequency domain resource of the first wake-up signal and the first PDCCH monitoring occasion; there is a correspondence between a code domain resource of the first wake-up signal and the first PDCCH monitoring occasion; there is a correspondence between a spatial domain resource of the first wake-up signal and the first PDCCH monitoring occasion; there is a correspondence between a sequence of the first wake-up signal and the first PDCCH monitoring occasion; or there is a correspondence between an identifier of the first wake-up signal and the first PDCCH monitoring occasion.

In a possible design, the apparatus 1500 includes a processing module 1502 and a transceiver module 1501. The apparatus 1500 is configured to perform an operation on a network device side in the procedure shown in FIG. 4.

The processing module 1502 is configured to generate a first wake-up signal, where the first wake-up signal is one of K wake-up signals, and K is an integer greater than or equal to 1. The transceiver module 1501 is configured to send the first wake-up signal. The processing module 1502 is further configured to generate downlink control information DCI used for paging. The transceiver module 1501 is further configured to send, on a first physical downlink control channel PDCCH monitoring occasion in M paging occasions, the DCI used for paging, where there is a correspondence between the first wake-up signal and the first PDCCH monitoring occasion, and M is an integer greater than or equal to 1.

Optionally, there is a correspondence between the K wake-up signals and the M paging occasions.

Optionally, one of the M paging occasions includes K PDCCH monitoring occasions, and the first PDCCH monitoring occasion is one of the K PDCCH monitoring occasions.

Optionally, the K wake-up signals are quasi co-located with K synchronization signal blocks SSBs, the K wake-up signals are quasi co-located with K channel state information-reference signals CSI-RSs, or the K wake-up signals are quasi co-located with K demodulation reference signals DMRSs.

Optionally, the K wake-up signals are generated based on a same sequence.

Optionally, that K is an integer greater than or equal to 1 is specifically: K is an integer greater than or equal to 2.

Optionally, the K wake-up signals occupy different frequency domain resources, or the K wake-up signals occupy different time domain resources.

Optionally, that there is a correspondence between the first wake-up signal and the first PDCCH monitoring occasion includes one or more of the following: There is a correspondence between a time domain resource of the first wake-up signal and the first PDCCH monitoring occasion; there is a correspondence between a frequency domain resource of the first wake-up signal and the first PDCCH monitoring occasion; there is a correspondence between a code domain resource of the first wake-up signal and the first PDCCH monitoring occasion; there is a correspondence between a spatial domain resource of the first wake-up signal and the first PDCCH monitoring occasion; there is a correspondence between a sequence of the first wake-up signal and the first PDCCH monitoring occasion; or there is a correspondence between an identifier of the first wake-up signal and the first PDCCH monitoring occasion.

In a possible design, the apparatus 1500 includes a processing module 1502 and a transceiver module 1501. The apparatus 1500 is configured to perform an operation on a terminal device side in the procedure shown in FIG. 10.

The transceiver module 1501 is configured to receive a first wake-up signal, where the first wake-up signal is one of K wake-up signals, and K is an integer greater than or equal to 1. The processing module 1502 is configured to determine M paging occasions, where there is a correspondence between the K wake-up signals and the M paging occasions, and M is an integer greater than or equal to 1. The transceiver module 1501 is further configured to receive, on the M paging occasions, downlink control information DCI used for paging.

Optionally, the processing module 1502 is further configured to determine a first physical downlink control channel PDCCH monitoring occasion in the M paging occasions, where there is a correspondence between the first wake-up signal and the first PDCCH monitoring occasion.

When receiving, on the M paging occasions, the DCI used for paging, the transceiver module 1501 is configured to receive, on the first PDCCH monitoring occasion in the M paging occasions, the DCI used for paging.

Optionally, one of the M paging occasions includes K PDCCH monitoring occasions, and the first PDCCH monitoring occasion is one of the K PDCCH monitoring occasions.

Optionally, that there is a correspondence between the first wake-up signal and the first PDCCH monitoring occasion includes one or more of the following: There is a correspondence between a time domain resource of the first wake-up signal and the first PDCCH monitoring occasion; there is a correspondence between a frequency domain resource of the first wake-up signal and the first PDCCH monitoring occasion; there is a correspondence between a code domain resource of the first wake-up signal and the first PDCCH monitoring occasion; there is a correspondence between a spatial domain resource of the first wake-up signal and the first PDCCH monitoring occasion; there is a correspondence between a sequence of the first wake-up signal and the first PDCCH monitoring occasion; or there is a correspondence between an identifier of the first wake-up signal and the first PDCCH monitoring occasion.

Optionally, the K wake-up signals are quasi co-located with K synchronization signal blocks SSBs, the K wake-up signals are quasi co-located with K channel state information-reference signals CSI-RSs, or the K wake-up signals are quasi co-located with K demodulation reference signals DMRSs.

Optionally, the K wake-up signals are generated based on a same sequence.

Optionally, that K is an integer greater than or equal to 1 is specifically: K is an integer greater than or equal to 2.

Optionally, the K wake-up signals occupy different frequency domain resources, or the K wake-up signals occupy different time domain resources.

In a possible design, the apparatus 1500 includes a transceiver module 1501 and a processing module 1502. The apparatus 1500 is configured to perform an operation on a network device side in the procedure shown in FIG. 10.

The processing module 1502 is configured to generate a first wake-up signal, where the first wake-up signal is one of K wake-up signals, and K is an integer greater than or equal to 1. The transceiver module 1501 is configured to send the first wake-up signal. The processing module 1502 is further configured to generate downlink control information DCI used for paging. The transceiver module 1501 is further configured to send, on M paging occasions, the DCI used for paging, where M is an integer greater than or equal to 1, and there is a correspondence between the K wake-up signals and the M paging occasions.

Optionally, when sending, on the M paging occasions, the DCI used for paging, the transceiver module 1501 is configured to send, on a first physical downlink control channel PDCCH monitoring occasion in the M paging occasions, the DCI used for paging, where there is a correspondence between the first wake-up signal and the first PDCCH monitoring occasion.

Optionally, one of the M paging occasions includes K PDCCH monitoring occasions, and the first PDCCH monitoring occasion is one of the K PDCCH monitoring occasions.

Optionally, that there is a correspondence between the first wake-up signal and the first PDCCH monitoring occasion includes one or more of the following: There is a correspondence between a time domain resource of the first wake-up signal and the first PDCCH monitoring occasion; there is a correspondence between a frequency domain resource of the first wake-up signal and the first PDCCH monitoring occasion; there is a correspondence between a code domain resource of the first wake-up signal and the first PDCCH monitoring occasion; there is a correspondence between a spatial domain resource of the first wake-up signal and the first PDCCH monitoring occasion; there is a correspondence between a sequence of the first wake-up signal and the first PDCCH monitoring occasion; or there is a correspondence between an identifier of the first wake-up signal and the first PDCCH monitoring occasion.

Optionally, the K wake-up signals are quasi co-located with K synchronization signal blocks SSBs, the K wake-up signals are quasi co-located with K channel state information-reference signals CSI-RSs, or the K wake-up signals are quasi co-located with K demodulation reference signals DMRSs.

Optionally, the K wake-up signals are generated based on a same sequence.

Optionally, that K is an integer greater than or equal to 1 is specifically: K is an integer greater than or equal to 2.

Optionally, the K wake-up signals occupy different frequency domain resources, or the K wake-up signals occupy different time domain resources.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, an apparatus provided in embodiments of this application may also correspondingly implement these features or functions. Details are not described herein.

A person skilled in the art may further understand that various illustrative logical blocks and steps that are listed in embodiments of this application may be implemented by using electronic hardware, computer software, or a combination thereof. Whether the functions are implemented by using hardware or software depends on particular applications and a design requirement of an entire system. A person skilled in the art may use various methods to implement the functions for corresponding application, but it should not be considered that the implementation goes beyond the scope of embodiments of this application.

It may be understood that, the processor in embodiments of this application may be an integrated circuit chip, and has a signal processing capability. In an implementation process, the steps in the foregoing method embodiments may be completed by using a hardware integrated logic circuit in the processor or instructions in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component.

The solutions described in this application may be implemented in various manners. For example, these technologies may be implemented by using hardware, software, or a combination of hardware and software. For hardware implementation, a processing unit configured to perform these technologies at a communication apparatus (for example, a base station, a terminal, a network entity, or a chip) may be implemented in one or more general-purpose processors, a DSP, a digital signal processing device, an ASIC, a programmable logic device, an FPGA, or another programmable logic apparatus, a discrete gate or transistor logic device, a discrete hardware component, or any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

It may be understood that, in embodiments of this application, the memory may be a transitory memory or a non-transitory memory, or may include both a transitory memory and a non-transitory memory. The non-transitory memory may be a read-only memory (ROM), a programmable read-only memory (PROM), an erasable programmable read-only memory (EPROM), an electrically erasable programmable read-only memory (EEPROM), or a flash memory. The transitory memory may be a random access memory (RAM), used as an external cache. By way of example but not limitation, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the system and method described in this specification includes but is not limited to these memories and any memory of another proper type.

This application further provides a computer-readable medium. The computer-readable medium stores a computer program. When the computer program is executed by a computer, functions of any one of the foregoing method embodiments are implemented.

This application further provides a computer program product. When the computer program product is executed by a computer, functions of any one of the foregoing method embodiments are implemented.

All or some of the foregoing embodiments may be implemented by using software, hardware, firmware, or any combination thereof. When software is used for implementation, all or some of embodiments may be implemented in a form of a computer program product. The computer program product includes one or more computer instructions. When the computer instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It may be understood that "an embodiment" mentioned in the entire specification means that particular features, structures, or characteristics related to the embodiment are included in at least one embodiment of this application. Therefore, embodiments in the entire specification are not necessarily same embodiments. In addition, these particular features, structures, or characteristics may be combined in one or more embodiments in any proper manner. It may be understood that sequence numbers of the foregoing processes do not mean an execution sequence in various embodiments of this application. The execution sequence of the processes should be determined based on functions and internal logic of the processes, and should not be construed as any limitation on the implementation processes of embodiments of this application.

It may be understood that, in this application, "when" and "if" mean that an apparatus performs corresponding processing in an objective situation, but do not constitute a limitation on time, do not require that the apparatus have a determining action during implementation, and do not mean any other limitation.

"Simultaneously" in this application may be understood as being at a same time point, may be understood as being within a time period, or may be understood as being within a same periodicity.

A person skilled in the art may understand that first, second, and various reference numerals in this application are for distinguishing only for ease of description, and are not used to limit the scope of embodiments of this application. A specific value of a numeral (which may also be referred to as an index), a specific value of a quantity, and a position in this application are merely used as an example, but are not unique representation forms, and are not used to limit the scope of embodiments of this application. First, second, and various reference numerals in this application are also for distinguishing only for ease of description, and are not used to limit the scope of embodiments of this application.

In this application, unless otherwise specified, an element represented in a singular form is intended to represent "one or more", but is not intended to represent "one and only one". In this application, unless otherwise specified, "at least one" is intended to represent "one or more", and "a plurality of" is intended to represent "two or more".

In addition, the terms "system" and "network" are usually used interchangeably in this specification. The term "and/or" in this specification describes only an association relationship for describing associated objects and represents that three relationships may exist. For example, A and/or B may represent the following three cases: only A exists, both A and B exist, and only B exists. A may be singular or plural, and B may be singular or plural. The character "/" usually indicates an "or" relationship between the associated objects.

The term "at least one of" in this specification indicates all or any combination of listed items. For example, "at least one of A, B, and C" may indicate the following six cases: Only A exists, only B exists, only C exists, both A and B exist, both B and C exist, and A, B and C all exist. A may be singular or plural, B may be singular or plural, and C may be singular or plural.

It may be understood that, in embodiments of this application, "B corresponding to A" indicates that B is associated with A, and B may be determined based on A. However, it should be further understood that determining B based on A does not mean that B is determined based only on A, that is, B may alternatively be determined based on A and/or other information.

The correspondences shown in the tables in this application may be configured, or may be predefined. Values of the information in the tables are merely examples, and other values may be configured. This is not limited in this application. When a correspondence between information and each parameter is configured, not all correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "store", "pre-store", "pre-negotiate", "pre-configure", "solidify", or "pre-burn".

A person of ordinary skill in the art may understand that units and algorithm steps in the examples described with reference to embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person of ordinary skill in the art may understand that, for a purpose of convenient and brief descriptions, for a detailed working process of the foregoing system, apparatus, and unit, refer to a corresponding process in the foregoing method embodiments. Details are not described herein again.

It may be understood that the system, apparatus, and method described in this application may alternatively be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate. Parts displayed as units may or may not be physical units, to be specific, may be located in one position, or may be distributed on a plurality of network units. Some or all of the units may be selected based on an actual requirement to achieve the objectives of the solutions of embodiments.

In addition, functional units in embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for indicating a computer device (which may be a personal computer, a server, or a network device) to perform all or some of the steps in the method described in embodiments of this application. The foregoing storage medium includes: any medium that can store program code, such as a USB flash drive, a removable hard disk, a read-only memory (ROM), a random access memory (RAM), a magnetic disk, or an optical disc.

For same or similar parts in embodiments of this application, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method according to an internal logical relationship thereof. The foregoing implementations of this application do not constitute a limitation on the protection scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. An apparatus, comprising:
one or more processors; and
one or more memories having instructions stored thereon that, when executed by the one or more processors, cause the apparatus to:
receive a first wake-up signal, wherein
the first wake-up signal is one of K wake-up signals,
K is an integer greater than or equal to 1, and
the K wake-up signals are quasi co-located with K synchronization signal blocks (SSBs), K channel state information-reference signals (CSI-RSs), or K demodulation reference signals (DMRSs);
determine M paging occasions and a first physical downlink control channel PDCCH) monitoring occasion in the M paging occasions, wherein
there is a correspondence between the K wake-up signals and the M paging occasions, there is a correspondence between the first wake-up signal and the first PDCCH monitoring occasion, and one of the M paging occasions comprises K PDCCH monitoring occasions, and the first PDCCH monitoring occasion is one of the K PDCCH monitoring occasions, and
M is an integer greater than or equal to 1;
receive downlink control information (DCI) used for paging on the first PDCCH monitoring occasion in the M paging occasions.

2. The apparatus according to claim 1, wherein the correspondence between the first wake-up signal and the first PDCCH monitoring occasion comprises one or more of:
a correspondence between a time domain resource of the first wake-up signal and the first PDCCH monitoring occasion;
a correspondence between a frequency domain resource of the first wake-up signal and the first PDCCH monitoring occasion;
a correspondence between a code domain resource of the first wake-up signal and the first PDCCH monitoring occasion;

a correspondence between a spatial domain resource of the first wake-up signal and the first PDCCH monitoring occasion;

a correspondence between a sequence of the first wake-up signal and the first PDCCH monitoring occasion; or a correspondence between an identifier of the first wake-up signal and the first PDCCH monitoring occasion.

3. The apparatus according to claim 1, wherein the K wake-up signals are generated based on an identical sequence.

4. The apparatus according to claim 1, wherein K is an integer greater than or equal to 2.

5. The apparatus according to claim 4, wherein the K wake-up signals occupy different frequency domain resources.

6. A communication method, comprising:
receiving a first wake-up signal, wherein
the first wake-up signal is one of K wake-up signals,
K is an integer greater than or equal to 1, and
the K wake-up signals are quasi co-located with K synchronization signal blocks (SSBs), K channel state information-reference signals (CSI-RSs), or K demodulation reference signals (DMRSs);
determining M paging occasions and a first physical downlink control channel (PDCCH) monitoring occasion in the M paging occasions, wherein
there is a correspondence between the K wake-up signals and the M paging occasions, there is a correspondence between the first wake-up signal and the first PDCCH monitoring occasion, and one of the M paging occasions comprises K PDCCH monitoring occasions, and the first PDCCH monitoring occasion is one of the K PDCCH monitoring occasions, and
M is an integer greater than or equal to 1;
receiving downlink control information (DCI) used for paging on the first PDCCH monitoring occasion in the M paging occasions.

7. The method according to claim 6, wherein the correspondence between the first wake-up signal and the first PDCCH monitoring occasion comprises one or more of:
a correspondence between a time domain resource of the first wake-up signal and the first PDCCH monitoring occasion;
a correspondence between a frequency domain resource of the first wake-up signal and the first PDCCH monitoring occasion;
a correspondence between a code domain resource of the first wake-up signal and the first PDCCH monitoring occasion;
a correspondence between a spatial domain resource of the first wake-up signal and the first PDCCH monitoring occasion;
a correspondence between a sequence of the first wake-up signal and the first PDCCH monitoring occasion; or
a correspondence between an identifier of the first wake-up signal and the first PDCCH monitoring occasion.

8. The method according to claim 6, K is an integer greater than or equal to 2.

9. The method according to claim 8, wherein the K wake-up signals occupy different time domain resources.

10. An apparatus, comprising:
one or more processors; and
one or more memories having instructions stored thereon that, when executed by the one or more processors, cause the apparatus to:
send a first wake-up signal, wherein
the first wake-up signal is one of K wake-up signals,
K is an integer greater than or equal to 1, and
the K wake-up signals are quasi co-located with K synchronization signal blocks (SSBs), K channel state information-reference signals (CSI-RSs), or K demodulation reference signals (DMRSs); and
send, on a first physical downlink control channel (PDCCH) monitoring occasion in M paging occasions, downlink control information (DCI) used for paging, wherein
there is a correspondence between the first wake-up signal and the first PDCCH monitoring occasion, and one of the M paging occasions comprises K PDCCH monitoring occasions, and the first PDCCH monitoring occasion is one of the K PDCCH monitoring occasions,
M is an integer greater than or equal to 1, and
there is a correspondence between the K wake-up signals and the M paging occasions.

11. The apparatus according to claim 10, wherein the correspondence between the first wake-up signal and the first PDCCH monitoring occasion comprises one or more of:
a correspondence between a time domain resource of the first wake-up signal and the first PDCCH monitoring occasion;
a correspondence between a frequency domain resource of the first wake-up signal and the first PDCCH monitoring occasion;
a correspondence between a code domain resource of the first wake-up signal and the first PDCCH monitoring occasion;
a correspondence between a spatial domain resource of the first wake-up signal and the first PDCCH monitoring occasion;
a correspondence between a sequence of the first wake-up signal and the first PDCCH monitoring occasion; or
a correspondence between an identifier of the first wake-up signal and the first PDCCH monitoring occasion.

12. The apparatus according to claim 10, wherein the K wake-up signals are generated based on an identical sequence.

13. The apparatus according to claim 10, wherein K is an integer greater than or equal to 2.

14. The apparatus according to claim 13, wherein
the K wake-up signals occupy different frequency domain resources, or
the K wake-up signals occupy different time domain resources.

* * * * *